US012576383B2

(12) United States Patent
Taghipour et al.

(10) Patent No.: US 12,576,383 B2
(45) Date of Patent: Mar. 17, 2026

(54) MULTI-REFLECTOR PHOTOREACTOR FOR CONTROLLED IRRADIATION OF FLUID

(71) Applicants: The University of British Columbia, Vancouver (CA); Watersprint AB, Burnaby (CA)

(72) Inventors: Fariborz Taghipour, Burnaby (CA); Babak Adeli Koudehi, Vancouver (CA)

(73) Assignee: The University of British Columbia, Vancouver (CA)

( * ) Notice: Subject to any disclaimer, the term of this patent is extended or adjusted under 35 U.S.C. 154(b) by 1096 days.

(21) Appl. No.: 17/553,404

(22) Filed: Dec. 16, 2021

(65) Prior Publication Data

US 2022/0176336 A1     Jun. 9, 2022

Related U.S. Application Data

(63) Continuation of application No. PCT/CA2020/050877, filed on Jun. 24, 2020.

(60) Provisional application No. 62/944,321, filed on Dec. 5, 2019, provisional application No. 62/865,484, filed on Jun. 24, 2019.

(51) Int. Cl.
      *B01J 19/12*        (2006.01)
      *B01J 19/00*        (2006.01)
(52) U.S. Cl.
      CPC ......... *B01J 19/123* (2013.01); *B01J 19/0053* (2013.01); *B01J 2219/0869* (2013.01); *B01J 2219/0877* (2013.01); *B01J 2219/1203* (2013.01)

(58) Field of Classification Search
      CPC ........ B01J 2219/0869; B01J 2219/0877; B01J 2219/1203; B01J 19/0053; B01J 19/123
      See application file for complete search history.

(56) References Cited

U.S. PATENT DOCUMENTS

| | | | |
|---|---|---|---|
| 5,200,156 | A | 4/1993 | Wedekamp |
| 5,874,741 | A | 2/1999 | Matschke |
| 6,303,086 | B1 | 10/2001 | Heimer |
| 6,323,601 | B1 | 11/2001 | Klein et al. |
| 6,454,937 | B1 | 9/2002 | Horton et al. |
| 7,002,140 | B2 | 2/2006 | Elsegood et al. |
| 7,011,434 | B2 | 3/2006 | Pate |
| 7,169,311 | B2 | 1/2007 | Saccomanno |

(Continued)

FOREIGN PATENT DOCUMENTS

| | | |
|---|---|---|
| CA | 2414544 | 3/2003 |
| CA | 3011888 A1 | 7/2018 |

(Continued)

*Primary Examiner* — Brian W Cohen
*Assistant Examiner* — Nathanael Jason Downes
(74) *Attorney, Agent, or Firm* — Todd A. Rattray, Oyen Wiggs Green & Mutala LLP

(57)                ABSTRACT

A UV reactor comprises a main chamber extending in a generally longitudinal direction. The main chamber may comprise a UV-LED and a reflective wall located at opposing longitudinal ends of the main chamber. Fluid enters main chamber through a fluid inlet and exits main chamber through a fluid outlet. The fluid inlet may be located at the reflective wall end of the main chamber. The fluid outlet may be located at the UV-LED end of the main chamber.

19 Claims, 28 Drawing Sheets

(56)                    References Cited

U.S. PATENT DOCUMENTS

| | | |
|---|---|---|
| 8,414,779 B2 | 4/2013 | Levy |
| 8,840,845 B2 | 9/2014 | Soler et al. |
| 8,921,813 B2 | 12/2014 | Palmer et al. |
| 9,260,323 B2 | 2/2016 | Boodaghians et al. |
| 9,304,273 B2 | 4/2016 | Childers |
| 9,346,687 B1 | 5/2016 | Matthews et al. |
| 9,376,333 B2 | 6/2016 | Boodaghians et al. |
| 9,540,252 B1 | 1/2017 | Collins et al. |
| 9,789,215 B1 | 10/2017 | Collins et al. |
| 9,834,456 B2 | 12/2017 | Collins et al. |
| 9,938,165 B2 | 4/2018 | Taghipour |
| 10,046,076 B1 | 8/2018 | Collins et al. |
| 10,062,817 B1 | 8/2018 | Sudradjat et al. |
| 10,105,460 B1 | 10/2018 | Collins et al. |
| 2005/0056597 A1* | 3/2005 | Fries ........................ C02F 1/30 |
| | | 210/748.08 |
| 2013/0153514 A1 | 6/2013 | Stern et al. |
| 2015/0076368 A1* | 3/2015 | Sargent ............... H01L 25/0753 |
| | | 362/249.02 |
| 2015/0266013 A1* | 9/2015 | Leung ..................... B01J 23/80 |
| | | 422/187 |
| 2015/0284266 A1 | 10/2015 | Matsui |
| 2015/0314024 A1 | 11/2015 | Khan et al. |
| 2016/0355412 A1 | 12/2016 | Collins et al. |
| 2017/0217791 A1 | 8/2017 | McNulty |
| 2018/0093904 A1 | 4/2018 | Collins et al. |
| 2018/0134584 A1 | 5/2018 | Kolch et al. |
| 2019/0184045 A1* | 6/2019 | Mochizuki ............... A61L 2/10 |

FOREIGN PATENT DOCUMENTS

| | | | |
|---|---|---|---|
| CA | 2980178 A1 | 3/2019 | |
| CN | 102187441 A | 9/2011 | |
| CN | 2017/10442229 | 6/2017 | |
| KR | 101650472 B1 | 9/2016 | |
| WO | WO-2017124190 A1 * | 7/2017 | ............. C02F 1/325 |
| WO | 201848654 A1 | 3/2018 | |
| WO | 2018213936 A1 | 11/2018 | |
| WO | 201914770 A1 | 1/2019 | |

* cited by examiner

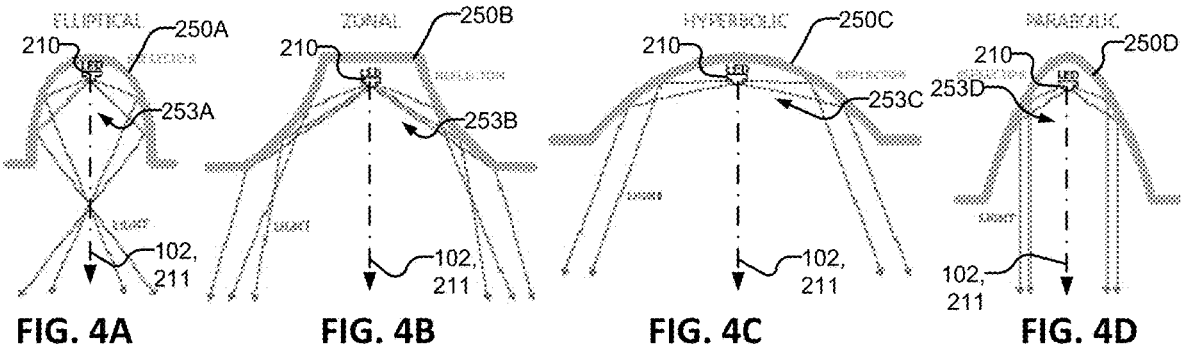
FIG. 4A  FIG. 4B  FIG. 4C  FIG. 4D

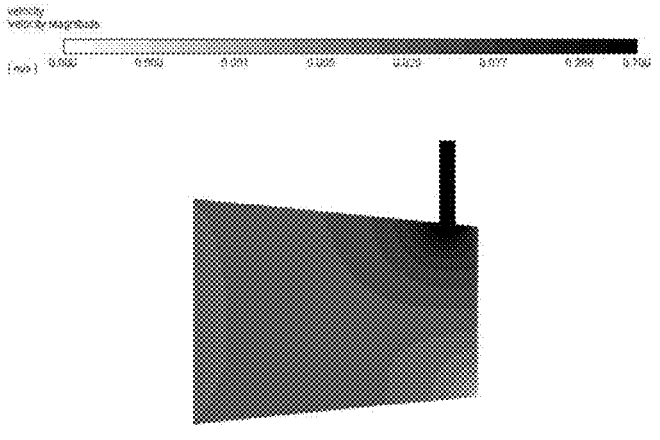
FIG. 10A
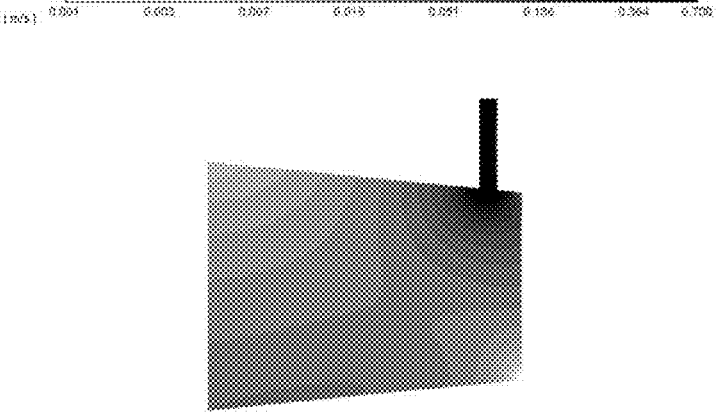
FIG. 10B
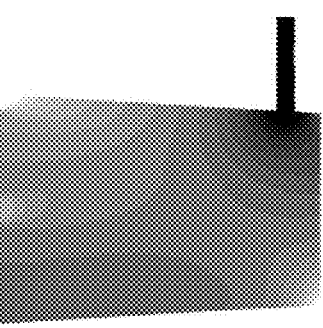
FIG. 10C

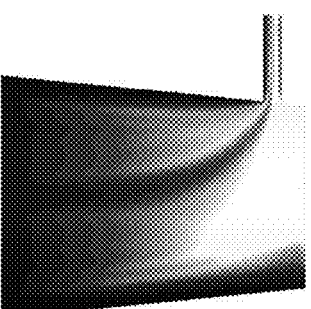
FIG. 10D
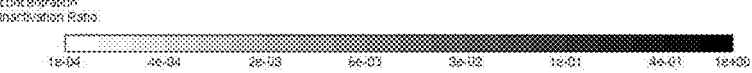
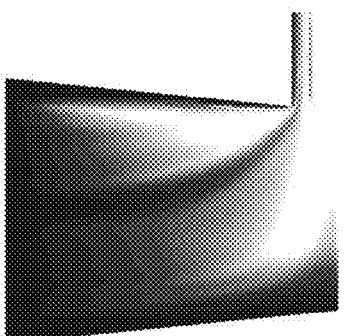
FIG. 10E
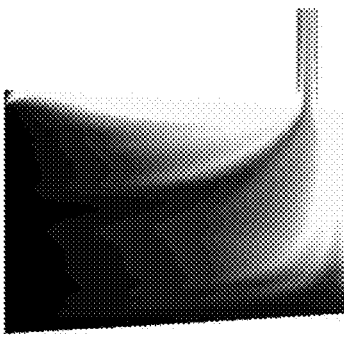
FIG. 10F

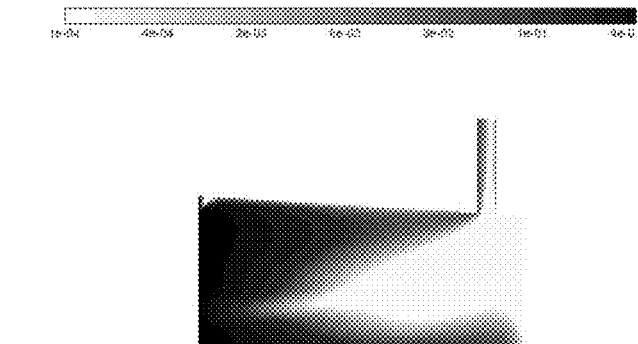
FIG. 10G
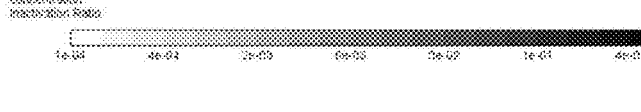
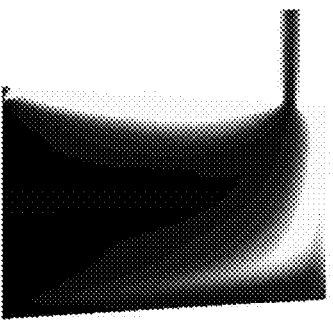
FIG. 10H
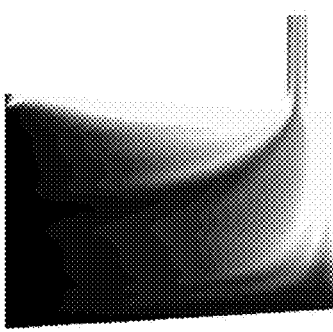
FIG. 10I

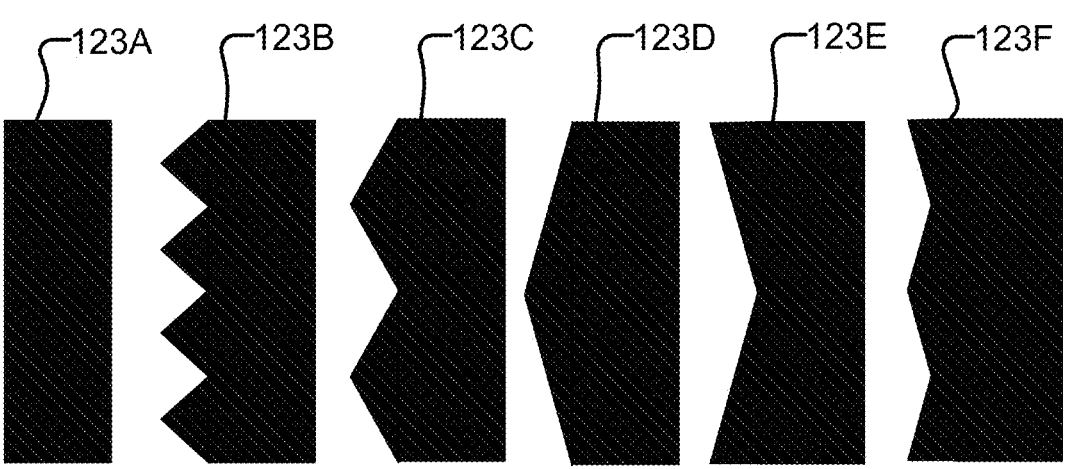
FIG. 11
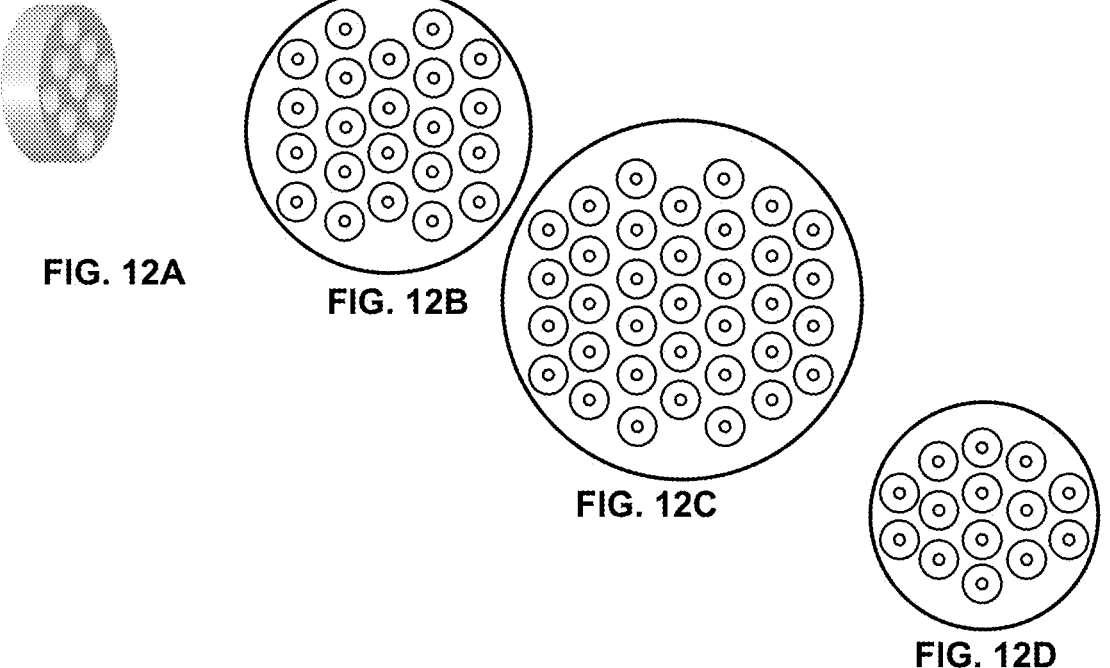
FIG. 12A
FIG. 12B
FIG. 12C
FIG. 12D

MULTI-REFLECTOR PHOTOREACTOR FOR CONTROLLED IRRADIATION OF FLUID

CROSS-REFERENCE TO RELATED APPLICATIONS

This application is a continuation of Patent Cooperation Treaty (PCT) application No. PCT/CA2020/050877 having an international filing date of 24 Jun. 2020, which in turn claims priority from, and for the purposes of the US the benefit of 35 USC 119 in connection with, U.S. application No. 62/865,484 filed 24 Jun. 2019 and U.S. application No. 62/944,321 filed 5 Dec. 2019. All of the applications mentioned in this paragraph are hereby incorporated herein by reference.

TECHNICAL FIELD

This technology described herein relates to radiation-based (e.g. ultraviolet (UV)) photoreactors and, more particularly, to radiation photoreactors comprising one or more solid-state radiation emitters (e.g. UV LEDs). Such photoreactors have applications in, for example, water and air purification. Particular embodiments provide methods and apparatus for providing desired radiation distribution and/or fluid velocity distribution in radiation-based photoreactors.

BACKGROUND

Ultraviolet (UV) photoreactors are reactors that administer UV radiation. UV reactors typically contain a UV source administering UV radiation to a fluid flowing through a chamber or conduit. Common UV sources include low and medium pressure mercury lamps. UV reactors are typically used to facilitate various photoreactions, photocatalytic reactions, and photo-initiated reactions. Example commercial applications for UV reactors include water and air purification.

Light emitting diodes (LEDs) are semiconductor (solid state) radiation sources that release photons when an electric potential is applied across the LED. LEDs typically emit radiation with narrow bandwidths. For some applications, the radiation emitted by LEDs is of sufficiently narrow bandwidth to be considered to be effectively monochromatic. LEDs can emit radiation in the ultraviolet (UV) region of the electromagnetic spectrum. Advantageously, such ultraviolet LEDs (UV-LEDs) can be designed to generate UV radiation at different wavelengths for different applications (e.g. DNA absorption, photocatalyst activation, etc.). Accordingly, UV-LEDs are sometimes used as the primary UV source in a UV reactor.

It is known to use UV-LEDs for irradiating fluids in UV photoreactors (e.g. for applications such as water disinfection). One issue with state of the art UV reactors is that there is considerable variation in the radiant power distribution of UV-LEDs, which, in turn, can result in an uneven radiant fluence rate distribution. Fluence rate (in $W/m^2$) is the radiant flux (power) passing from all directions through an infinitesimally small sphere of cross-sectional area dA, divided by dA. Another issue in photoreactor design is that there is typically variation in the velocity distribution of a fluid (e.g. water) flowing through the reactor, which, in turn, can result in a residence time distribution of fluid travelling through the reactor. Either or both of these issues can cause a considerably wide range of UV dose (a product of fluence rate and residence time) distribution delivered to fluid elements passing through the UV reactor. In other words, the variation in the UV fluence rate distribution and/or the variation in the fluid velocity distribution may cause parts of the fluid to flow through a UV reactor without receiving sufficient UV dose. This problem is sometimes referred to as "short-circuiting" in the field of UV disinfection.

There is a general desire to prevent, minimize or otherwise mitigate short-circuiting in UV reactors.

There is also a general desire to enhance dose uniformity delivered to fluids passing through a UV reactor.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

Aspects of the invention include without limitation:

methods and systems for administering UV radiation to a fluid moving through photoreactors;

methods and apparatus for controlling the radiation profile of a UV-LED; and methods and apparatus for providing desired quantities of UV radiation and/or desired fluid velocity distribution for fluids flowing through UV photoreactors.

One aspect of the invention provides a fluid treatment apparatus comprising: a main chamber defined by a body, the main chamber extending in a longitudinal direction; and a radiation emitter located at a first longitudinal end of the main chamber. The radiation emitter further comprises: a reflector cone comprising a reflective surface that defines a reflector cone concavity; and a radiation source located in the reflector cone concavity. The reflective surface of the reflector cone is shaped to direct radiation from the radiation source into the main chamber in a direction having at least a component oriented in the longitudinal direction. The apparatus further comprises a reflective wall located at a second, opposing longitudinal end of the main chamber. The reflective wall comprises a reflective surface facing the main chamber.

Another aspect of the invention provides a method for fluid treatment. The method comprises: providing a body that defines a main chamber, the main chamber extending in a longitudinal direction; and locating a radiation emitter at a first longitudinal end of the main chamber. The radiation emitter further comprising: a reflector cone comprising a reflective surface that defines a reflector cone concavity; and a radiation source located in the reflector cone concavity. The reflective surface of the reflector cone is shaped to direct radiation from the radiation source into the main chamber in a direction having at least a component oriented in the longitudinal direction. The method comprises locating a reflective wall at a second, opposing longitudinal end of the main chamber. The reflective wall comprises a reflective surface facing the main chamber.

The reflective wall may be shaped to define one or more openings in fluid communication with the main chamber. The one or more openings may provide at least one of: an inlet for conducting fluid into the main chamber and an outlet for conducting fluid out of the main chamber. The reflective surface of the reflective wall may have a transverse surface area that is greater than a transverse cross-section of the main chamber at the first longitudinal end of the main chamber.

A longitudinally central region of the main chamber may be symmetric about a longitudinally oriented axis of symmetry. The reflector surface may be shaped so that radiation emitted into the main chamber has a longitudinally oriented principal optical axis. The axis of symmetry of the main chamber and the longitudinally oriented principal optical axis may be co-axial.

The reflective surface of the reflector cone may be shaped to be paraboloidic over a first portion of the reflective surface and ellipsoidal over a second portion of the reflective surface. The first portion of the reflective surface may be relatively proximate to the radiation source and the second portion of the reflective surface may be relatively distal to the radiation source. The first portion of the reflective surface may be relatively distal to the radiation source and the second portion of the reflective surface may be relatively proximate to the radiation source. The first portion of the reflective surface may extend over a first range of azimuthal angles and the second portion of the reflective surface may extend over a second range of azimuthal angles. The reflective surface of the reflector cone may be further shaped to be paraboloidic over a third portion of the reflective surface. The second portion may be located between the first and third portions.

The one or more openings in the reflective wall may provide an inlet for conducting fluid into the main chamber. The apparatus may further comprise an outlet for conducting fluid out of the main chamber. The outlet relatively proximate to the emitter when compared to the inlet. The one or more openings in the reflective wall may be non-uniformly distributed within the reflective wall. The one or more openings in the reflective wall may be shaped to provide non-uniform flow of fluid into the main chamber. The one or more openings in the reflective wall may be shaped to provide a higher fluid flow rate in regions relatively distal from the outlet and a lower fluid flow rate in regions relatively proximate to the outlet. The one or more openings in the reflective wall may have greater cross-section per unit area of the reflective wall in regions relatively distal from the outlet and a lower and lesser cross-section per unit area of the reflective wall in regions relatively proximate to the outlet. The outlet may be located at one transverse region of the main chamber and the one or more openings in the reflective wall may be shaped to provide a higher fluid flow rate in transverse regions relatively distal from the one transverse region and a lower fluid flow rate in transverse regions relatively proximate to the one transverse region. The outlet may be located at one transverse region of the main chamber and the one or more openings in the reflective wall may have greater cross-section per unit area of the reflective wall in transverse regions relatively distal from the one transverse region and a lower and lesser cross-section per unit area of the reflective wall in transverse regions relatively proximate to the one transverse region.

The apparatus may comprise a plurality of auxiliary reflectors. Each of the auxiliary reflectors may be disposed, relative to the reflective wall to partially cover at least one of the one or more openings. The auxiliary reflectors may be positioned to provide additional reflection of at least some of the radiation emitted by the radiation emitter which would otherwise pass through the one or more openings, while still permitting fluid communication between the main chamber and the one or more openings.

The apparatus may comprise a plurality of auxiliary reflectors. Each of the auxiliary reflectors may extend from the reflective surface in a non-orthogonal direction. Each of the auxiliary reflectors may comprise a reflective surface to provide additional reflection of at least some of the radiation emitted by the radiation emitter which would otherwise pass through the one or more openings, while still permitting fluid communication between the main chamber and the one or more openings.

The apparatus may comprise a secondary reflective wall that is longitudinally spaced apart from the reflective wall. The secondary reflective wall may be shaped to provide secondary openings therethrough, wherein at least some portions of the secondary reflective wall are located to overlap, in the longitudinal direction, with the one or more openings in the reflective wall, so that the at least some portions of the secondary reflective wall cover at least some of the one or more openings in the reflective wall, while permitting fluid communication among the main chamber, the secondary openings in the secondary reflective wall and the one or more openings in the reflective wall.

The apparatus may comprise one or more lenses positioned to refract radiation from the radiation source.

The apparatus may comprise: a second radiation emitter located at the second longitudinal end of main chamber. The second radiation emitter may further comprise: a second reflector cone comprising a second reflective surface that defines a second reflector cone concavity; and a second radiation source located in the second reflector cone concavity. The second reflective surface of the second reflector cone may be shaped to direct radiation from the second radiation source into the main chamber in a direction having at least a component oriented in the longitudinal direction and opposite to that of the at least a component of radiation from the radiation source. The apparatus may comprise: a second reflective wall located at the first longitudinal end of the main chamber. The second reflective wall may comprise a second reflective surface facing the main chamber.

Each of the first and second radiation sources may comprise a corresponding plurality of solid state radiation emitters.

Transverse cross-sections of the main chamber at longitudinally spaced apart locations may have the same size and shape.

The apparatus may comprise a longitudinally extending wall located in the main chamber. The longitudinally extending wall and the body may at least partially define a plurality of channels within the main chamber. The radiation emitter may be located to emit radiation into each of the plurality of channels. The apparatus may comprise a plurality of radiation emitters, each radiation emitter located to emit radiation into a corresponding one of the plurality of channels. At least a portion of the longitudinally extending wall may comprise a reflective surface. At least a portion of the longitudinally extending wall may be UV transparent. At least a portion of the longitudinally extending wall may comprise a photocatalyst material. The longitudinally extending wall may, at an end relatively proximate to the radiation source and/or at other suitable locations, comprise one or more protrusions and/or recesses oriented at one or more angles with respect to a transverse direction.

The radiation emitter may comprise a plurality of solid state emitters. Each of the plurality of solid state emitters may comprise a p-n junction. Each of the plurality of solid state emitters may be provided as a chip-on-board. The plurality of solid state emitters may be provided on a single substrate. The single substrate may be thermally conductive.

The reflector cone may be shaped, and the radiation source may be located, such that a parameter $\Delta$ satisfies the relationship $0.0 \leq \Delta \leq 0.6$, where $\Delta = x/L$, L is a longitudinal direction depth of the reflector cone concavity between an effective apex of the reflector cone concavity and opposing longitudinal edges of the reflector cone concavity and x is a distance between the effective apex and the longitudinal direction location of the radiation source.

A surface of the reflective wall facing the main chamber may be coated with a UV-transparent material, such as, without limitation, quartz or fused silica.

Another aspect of the invention provides a fluid treatment apparatus comprising: a body extending along a flow path between a first end and a second end opposite of the first end along the flow path, the first end comprising an inlet along the flow path, the second end comprising an outlet along the flow path; a flow channel extending inside the body along the flow path to direct a fluid from the inlet to the outlet; a solid-state radiation source mountable in a cavity in the flow channel to emit radiation in the flow channel along the flow path; and a thermal conductor thermally coupled to the solid-state radiation source and positioned to be contacted by the fluid when the fluid is flowing from the inlet to the outlet and the solid-state radiation source is mounted in the cavity; a reflector cone shaped to reflect radiation from the solid-state radiation source into the flow channel.

The apparatus may comprise a photocatalyst supported on a structure in the main chamber.

The apparatus may comprise a flow restraining element for restraining the fluid flow in the main chamber, the flow restraining element comprising at least one of a static mixer, a baffle, and a vortex generator.

The one or more main chamber defining surfaces of the body may support a photocatalyst material. The one or more main chamber defining surfaces of the body may comprise a reflective surface.

Another aspect of the invention provides a fluid treatment apparatus comprising: a main chamber defined by a body, the main chamber extending in a longitudinal direction; and a radiation emitter located at a first longitudinal end of the main chamber. The radiation emitter further comprises: a reflector cone comprising a reflective surface that defines a reflector cone concavity, the reflective surface shaped to be paraboloidic over a first portion of the reflective surface and ellipsoidal over a second portion of the reflective surface; and a radiation source located in the reflector cone concavity. The reflective surface of the reflector cone is shaped to direct radiation from the radiation source into the main chamber in a direction having at least a component oriented in the longitudinal direction.

The first portion of the reflective surface may be relatively proximate to the radiation source and the second portion of the reflective surface may be relatively distal to the radiation source. The first portion of the reflective surface may be relatively distal to the radiation source and the second portion of the reflective surface may be relatively proximate to the radiation source. The first portion of the reflective surface may extend over a first range of azimuthal angles and the second portion of the reflective surface may extend over a second range of azimuthal angles.

The reflective surface of the reflector cone may be further shaped to be paraboloidic over a third portion of the reflective surface. The second portion may be located between the first and third portions.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIGS. 4A-D schematically illustrates example constructions of various reflector cones which may be used alone or in combination in various embodiments of the FIG. 1 reactor.

FIGS. 10A-I are schematic diagrams depicting various experimental simulation results of UV reactors designed according to particular embodiments of the invention.

FIG. 11 illustrates non-limiting example patterned, mixing-promoting edge surfaces for the longitudinal end of the divider in the embodiments of FIGS. 7E-7H according to particular embodiments.

FIGS. 12A-12D illustrate various non-limiting examples of emitters comprising a plurality of radiation sources (e.g. UV_LEDs) with each radiation source having a corresponding reflective cone.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Embodiments described herein relate to apparatus, systems and methods for providing desirable dose uniformity for fluids traversing a radiation-based solid state reactor (e.g. a UV photoreactor comprising one or more UV-LED radiation sources). Such desirable dose uniformity may be achieved by controlling both the fluidic and optical environments to thereby control fluid velocity profiles of fluids traversing the reactor and fluence rate profiles of the radiation at different locations in the reactor. Some embodiments are described with reference to particular radiation sources, fluids, and radiation types. For example, the radiation source may be a solid-state radiation source such as UV-LED, the fluid may be water, and the radiation may include a UV radiation. Unless expressly recited in the claims, these examples are provided for convenience and brevity and these examples are not intended to limit the present disclosure. Accordingly, any structural embodiments described in this disclosure may be utilized with any analogous radiation sources, fluids, and/or radiation types.

Definitions

In this description and the accompanying claims, a number of surfaces are described as being reflective surfaces. Such reflective surfaces may be coated with or otherwise covered with UV-transparent protective materials, UV-enhanced materials and/or biocompatible materials (e.g. materials that are safe to be in contact with drinking water). Unless the context dictates otherwise, references herein to such reflective surfaces should be understood to include reflective surfaces covered by any such protective, UV-enhanced and/or biocompatible materials, where present.

EXEMPLARY EMBODIMENTS

Figure 1:
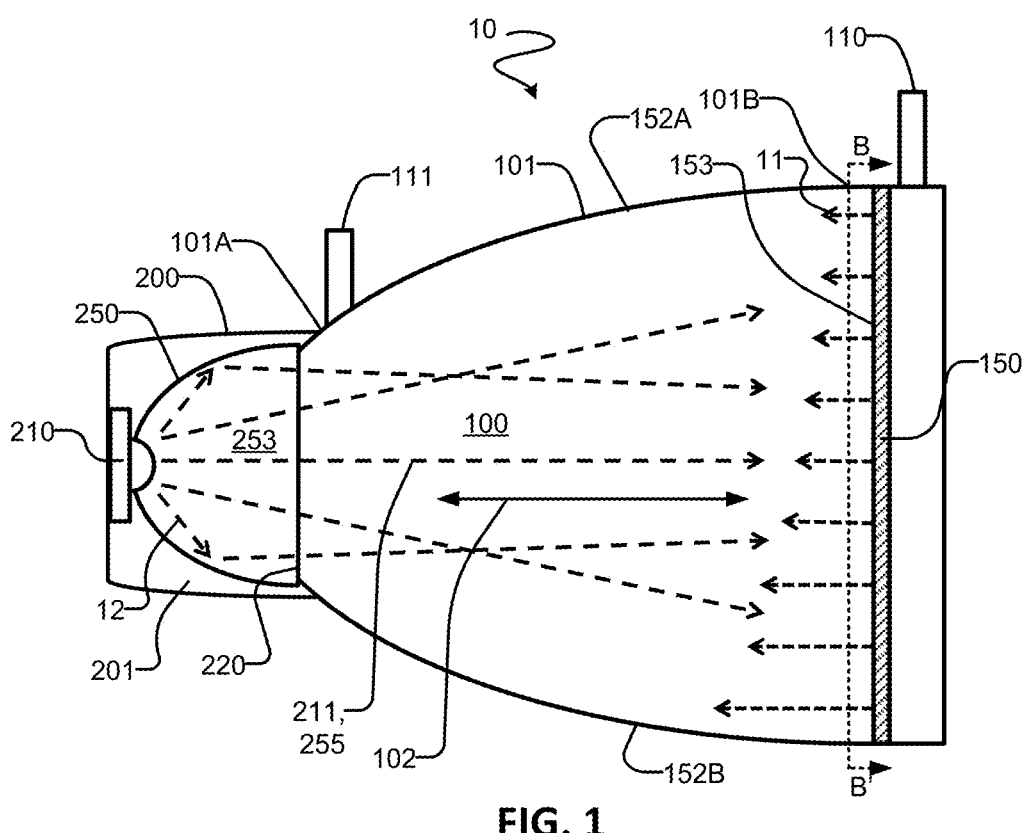
FIG. 1 is a schematic longitudinally oriented cross-section view of a UV reactor according to an example embodiment of the invention.
Figures 1A, 1B:
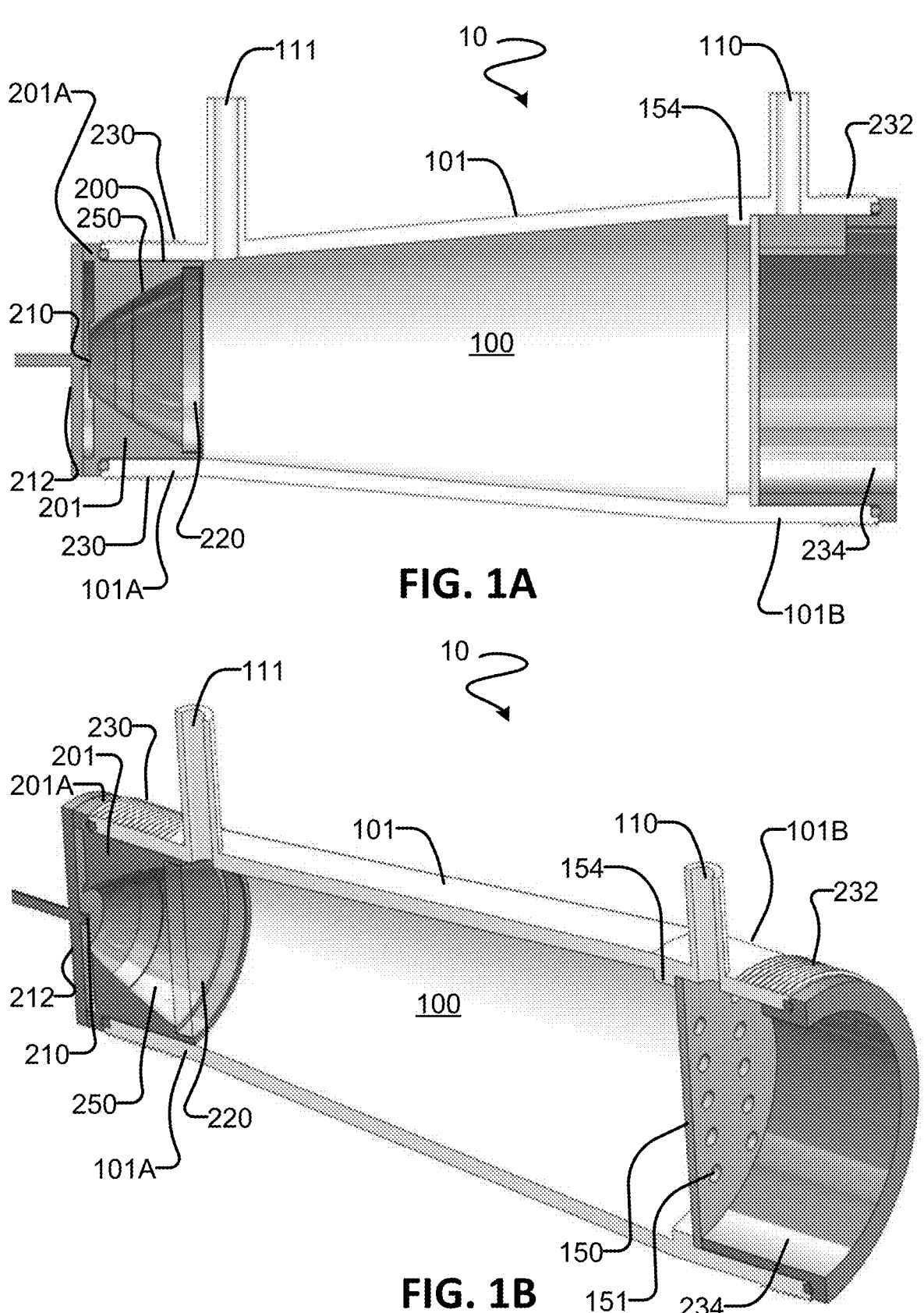
FIG. 1A is a longitudinally oriented cross-sectional view of a potential implementation of the UV reactor shown schematically in FIG. 1.
FIG. 1B is a perspective cross sectional view of the FIG. 1A UV reactor.

FIG. 1 is a schematic side view of a reactor 10 according to an example embodiment. FIGS. 1A and 1B show other views of a potential implementation of the reactor 10 shown schematically in FIG. 1. Reactor 10 comprises a body (e.g. reactor body or conduit body) 101 that defines a main chamber 100 extending in a generally longitudinal direction 102 between a fluid inlet 110 and one or more fluid outlets 111 (depicted as a single fluid outlet in the FIG. 1 embodiment). Fluid 11 enters main chamber 100 through inlet 110, flows through main chamber 100, and exits main chamber 100 at outlet 111. Main chamber 100 may be designed to provide larger transverse cross-sectional areas (e.g. cross-sections on planes orthogonal to longitudinal direction 102 or having a normal vector parallel to longitudinal direction 102) at locations relatively closer to inlet 100 (and/or to inlet end 101B of reactor 10) and smaller transverse cross-sectional areas at locations relatively closer to outlet 111

(and/or to outlet end 101A of reactor 10). Main chamber 100 may be conically or frustro-conically shaped in some embodiments.

A solid state radiation emitter 200 is located (e.g. coupled to body 101) at a longitudinal end of main chamber 100 to deliver radiation 12 to fluid 11 as fluid 11 flows through main chamber 100. In the FIG. 1 embodiment, emitter 200 is located at the fluid outlet end 101A of main chamber 100 (i.e. at a longitudinal end of main chamber 100 that is relatively proximate to fluid outlet 111 and/or relatively distal from fluid inlet 110 when compared to the opposing longitudinal end (fluid inlet end 101B) of main chamber 100).

Emitter 200 may comprise an outer casing 201 made of suitable thermally conductive material such as a metal, metal alloy, thermally conductive polymers, metal nitrites, metal nitrides, ceramics and/or the like (see FIGS. 1A-B). Thermally conductive casing 201 may be thermally conductively coupled to body 101.

In the FIG. 1 example embodiment, emitter 200 comprises an ultraviolet (UV) radiation source 210 positioned to direct UV radiation through a reflector cone 250. As described in more detail below, reflector cone 250 need not be conically shaped in the strict sense. Instead, the term cone is used herein for convenience and/or brevity. In some embodiments, reflector cone 250 may be truncated such that it does not have a singular apex. UV radiation source 210 may comprise one or more suitable solid-state UV emitters, such as UV light emitting diodes (UV-LEDs) and/or the like, with their principal optical axes oriented in the longitudinal direction 102 from fluid outlet end 101A toward fluid inlet end 101B of reactor 10. Reflector cone 250 (which need not be strictly conical in shape) may be shaped to define a reflector cone concavity 253 having larger transverse cross-sectional areas (e.g. cross-sections on planes orthogonal to longitudinal direction 102 or having a normal vector parallel to longitudinal direction 102) at locations relatively further away from radiation source 210 along longitudinal direction 102 and smaller transverse cross-sectional areas at locations relatively closer to radiation source 210 along longitudinal direction 102. Reflector cone 250 may be shaped to focus, direct and/or collimate UV radiation 12 emitted by radiation source 210.

In some embodiments, reflector cone 250 comprises a surface which is coated with or otherwise comprises a material (e.g. aluminum) that is reflective to radiation emitted by emitter 200. The reflective surface of reflector cone 250 may be the surface of reflector cone 250 that defines reflector cone concavity 253. The reflective surface(s) of reflector cone 250 may be substantially specularly reflective at the wavelengths of the radiation sources used in emitter 200. In some non-limiting embodiments, the radiation sources used in emitter 200 may comprise UV-LED sources in the UV-C range (e.g. wavelengths on the order of 250-290 nm) and the reflective surface(s) of reflector cone 250 may be substantially specularly reflective at these UV-C wavelengths. In some embodiments, the reflective material in of reflector cone 250 is coated with or is otherwise covered by or otherwise comprises a UV-enhanced and/or UV-protective coating material (e.g. dielectrics, fluorine based compounds, etc.). In some embodiments, the reflective surface of reflector cone 250 is coated with or otherwise comprises suitable UV-transparent materials for protecting the surface from oxidation, corrosion, etc. In some embodiments, the reflective surface of reflector cone 250 is coated with or otherwise comprises suitable biocompatible materials. For the purposes of this disclosure, unless the context dictates otherwise, references to the reflective surface of a reflector cone (e.g. reflector cone 250) should be understood to include the reflective surface of the reflector cone covered by any such protective, UV-enhanced and/or biocompatible material, where present.

Emitter 200, of the FIG. 1 embodiment, further comprises an optional UV transparent window 220 (e.g. a quartz window) located in front of reflector cone 250. Window 220 allows transmission of UV radiation 12 from radiation source 210 into main chamber 100, while preventing fluid 11 from flowing from main chamber 100 into an inside of emitter 200 (e.g. preventing fluid from accessing reflector cone concavity 253).

In particular embodiments, an emitter cap (not shown) may be secured to outlet end 101A of body 101 to secure emitter 200 to body 101. For example, in the illustrated example of FIGS. 1A and 1B, an emitter cap having internal threads may be threaded over a threaded portion 230 of body 101 located at the outlet end 101A of main chamber 100. When the emitter cap is fully threaded onto portion 230, the emitter cap abuts against a surface 212 of emitter 200 which is relatively distal from body 101. Outer casing 201 of emitter 200 may comprise a transversely extending flange 201A, shaped such that threading the emitter cap onto portion 230 causes flange 201A to abut against a surface of body 101, which thereby securely retains emitter 200 to body 101. Threadably attaching an emitter cap to body 101 is but one example of any number of possible ways to mount emitter 200 to body 101. In other example embodiments, an emitter cap may be secured to body 101 by way of a friction fit, welding, suitable adhesive or other suitable mechanical connections.

FIGS. 1A and 1B also illustrate how reflective wall 150 may be secured to body 101 (e.g. the inlet end 101B of body 101) according to a particular embodiment. Chamber 100 may comprise a transversely inwardly extending flange 154 at fluid inlet end 101B for maintaining a desired longitudinal position of reflector 150. Body 101 of the FIG. 1A, 1B embodiment comprises a threaded portion 232 located at the fluid inlet end 101B. A flanged sleeve 234 has an outer diameter which corresponds to an inner diameter of body 101 at the fluid inlet end 101B. Fluid inlet end 101B of reactor 10 may be assembled by first inserting reflector 150 into chamber 100 against flange 154, inserting flanged sleeve 234 against reflector 150, and then threading an inlet cap (not shown) having internal threads over threaded portion 232. The inlet cap may comprise a transversely extending flange which abuts against a corresponding transversely extending flange of sleeve 234, which in turn abuts against a surface of body 101, such that fully threading the inlet cap securely retains reflector 150 and sleeve 234 to body 101. As illustrated in FIG. 1B, a suitably shaped portion of sleeve 234 may be cut away or otherwise omitted to accommodate the flow of fluid through a fluid inlet or outlet (fluid inlet 110 in the illustrated example).

Threadably attaching an inlet cap to body 101 is but one example of any number of possible ways to reflective wall 150 to body 101. In other example embodiments, an inlet cap may be secured to body 101 by way of a friction fit, welding, suitable adhesive or other suitable mechanical connections. In some embodiments, fluid inlet 110 may be provided on the inlet cap instead of on body 101. In other embodiments of UV reactors described herein, it is possible for fluid inlet 110 and fluid outlet 111 to both be provided on the inlet cap.

Reflective Wall

In the FIG. 1 example embodiment, body 101 comprises a reflective wall 150 located at the fluid inlet end 101B of main chamber 100. Reflective wall 150 is shaped to define a plurality of openings 151 that allow fluid 11 to flow through reflective wall 150 from inlet 110 into main chamber 100 (see FIG. 1B). Reflective wall 150 may comprise one or more surface layers (on the surface 153 of reflective wall 150 facing main chamber 100) of material that is reflective to the radiation emitted by emitter 200. In the case of UV radiation, such reflective material may comprise aluminum, silver, Polytetrafluoroethylene (PTFE, commonly known as Teflon™) and/or the like. The reflective surface 153 of reflective wall 150 may be primarily diffusively reflective at the wavelengths of the radiation sources used in emitter 200. In some non-limiting embodiments, the radiation sources used in emitter 200 may comprise UV-LED sources in the UV-C range (e.g. wavelengths on the order of 250-290 nm) and the reflective surface 153 of reflective wall 150 may be primarily diffusively reflective at these UV-C wavelengths. This is not necessary, however, and reflective surface 153 may be specularly reflective. In some embodiments, such reflective material is coated with or otherwise comprises a UV-transparent film to protect surface 153 of reflective wall 150 from oxidation, corrosion, etc. In some embodiments, the reflective surface 153 of reflective wall 150 (or the reflective surface of any other reflective wall described herein) is coated with or otherwise covered by or otherwise comprises a UV-enhanced and/or UV-protective coating material (e.g. dielectrics, fluorine based compounds, etc.). In some embodiments, such reflective material is coated with or otherwise comprises a UV-transparent a biocompatible material. For the purposes of this disclosure, unless the context dictates otherwise, references to the reflective surface 153 of reflective wall 150 (or the reflective surface of any other reflective wall described herein) should be understood to include the reflective surface covered by any such protective, UV-enhanced and/or biocompatible material, where present. In some embodiments, reflective surface 153 comprises a surface finish to provide diffusive and/or specular reflection of radiation 12 impinging on reflective wall 150. For example, reflective surface 153 of reflective wall 150 may comprise a surface roughness on the order of 0.1 to 3 times the wavelength of radiation 12 (e.g. 250 nm) to provide specular reflection. In some embodiments, a secondary UV reflective plate having a reflective surface similar to surface 153 may be positioned at the far-end of body 101 (e.g. further from emitter 200 than reflective wall 150) to reflect radiation that passes through surface 153 back into chamber 100.

Prior to impinging on reflective wall 150, radiation 12 that is emitted by emitter 200 may have a directionality with components oriented in longitudinal direction 102 from fluid outlet end 101A toward fluid inlet end 101B (e.g. generally opposed to an average direction of fluid flow). Radiation 12 impinging on reflective wall 150 is reflected from reflective wall 150 and may then have a directionality with components oriented in longitudinal direction 102 from fluid inlet end 101B toward fluid outlet end 101BA (e.g. generally aligned to an average direction of fluid flow).

In some embodiments, reflective wall 150 has a larger transverse cross-sectional area than the main chamber 100 at locations spaced apart (in longitudinal direction 102) from reflective wall 150. In some embodiments, reflective wall 150 has a larger transverse cross-sectional area than window 220.

Figures 2A, 2B, 2C:
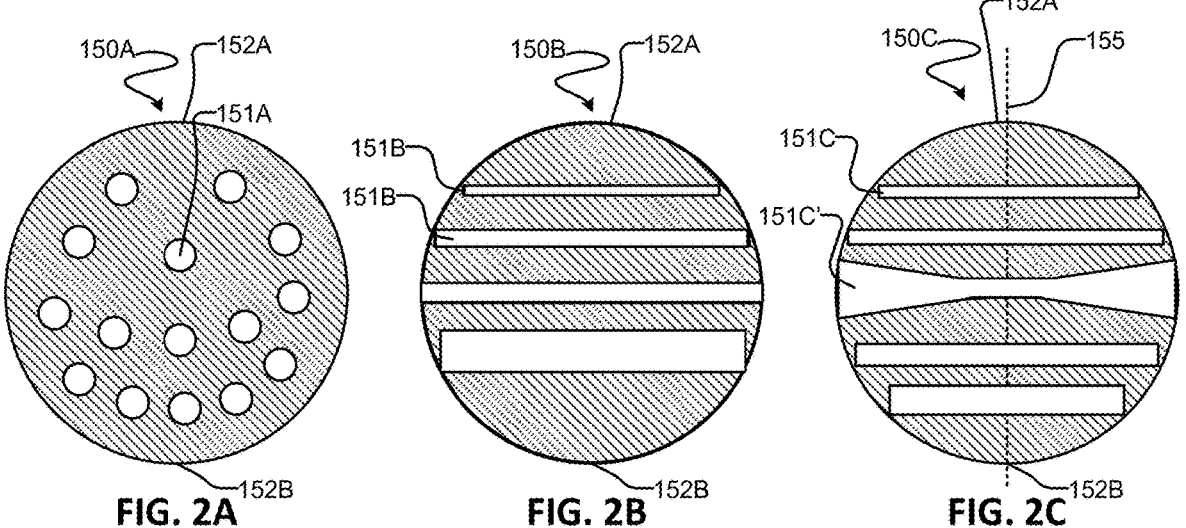
FIGS. 2A-C are schematic cross sections of the FIG. 1 UV reactor along line B-B' shown in FIG. 1, illustrating a reflective wall of the FIG. 1 UV reactor according to a number of example embodiments.

FIGS. 2A-C are schematic cross sections of the FIG. 1 UV reactor along line B-B' shown in FIG. 1, respectively illustrating reflective walls 150A, 150B, 150C suitable for use as reflective wall 150 of the FIG. 1 UV reactor according to a number of example embodiments. Each of reflective walls 150A, 150B, 150C (collectively, reflective walls 150) is shaped to provide a plurality of respective openings 151A, 151B, 151C (collectively, openings 151) which allow fluid 11 to flow from inlet 110 into main chamber 100.

In general, at transverse locations where it is desirable to have a relatively high fluid flow rate within main chamber 100, the transverse areas of openings 151 in reflective wall 150 as a fraction of the total area of reflective wall 150 may be relatively large. Conversely, at transverse locations where it is desirable to have a relatively low fluid flow rate within main chamber 100, the transverse areas of the openings 151 in reflective wall 150 as a fraction of the total area of reflective wall 150 may be relatively small.

In the example embodiments shown in FIG. 1 and FIGS. 2A-C, it may be desirable to have relatively low fluid flow rate at transverse locations relatively proximate to an outlet transverse side 152A (e.g. the top of main chamber 100 in the illustrated view of FIG. 1 and the top of reflective walls 150 in FIGS. 2A-C), since outlet 111 is located at outlet transverse side 152A of main chamber 100 and, consequently, fluid 11 proximate to outlet transverse side 152A of main chamber 100 has less distance to travel within main chamber 100 than fluid 11 proximate to opposing transverse side 1526 (e.g. the bottom of main chamber 100 in the illustrated view of FIG. 1 and the bottom of reflective walls 150 in FIGS. 2A-C). Having relatively low fluid flow rate at locations relatively proximate to outlet transverse side 152A of main chamber 100 allows fluid 11 flowing at locations relatively proximate to outlet transverse side 152A of main chamber 100 to have similar residence time as fluid 11 flowing at locations proximate to opposing transverse side 1526 of main chamber 100, where such fluid 11 has a greater distance to travel within main chamber 100 than fluid 11 proximate to outlet transverse side 152A. This uniformity of residence time may advantageously enhance dose uniformity delivered to fluid 11 as fluid 11 flows through main chamber 100 in some situations, since dose is a product of fluence rate and residence time Openings 151 can be designed in a variety of ways (e.g. size, shape and/or location) to provide larger transverse area of openings 151 at transverse locations of reflective wall 150 corresponding to transverse locations of main chamber 100 where it is desirable to have higher corresponding fluid flow rate and lower transverse area of openings 151 at transverse locations of reflective wall 150 corresponding to transverse locations of main chamber 100 where it is desirable to have lower corresponding fluid flow rate.

In the FIG. 2A embodiment, reflective wall 150A defines generally circular openings 151A of the same size. Reflective wall 150A of the FIG. 2A embodiment, provides a greater density of openings 151A at transverse locations of reflective wall 150A corresponding to opposing transverse side 1526 of main chamber 100 (e.g. relatively distal from fluid outlet 111 and at the bottom of reflective wall 150A in the FIG. 2A view) and a lower density of openings 151A at transverse locations of reflective wall 150A corresponding to outlet transverse side 152A of main chamber 100 (e.g. relatively proximate to fluid outlet 111 and at the top of reflective wall 150A in the FIG. 2A view). This variation in the density of apertures 151A (or equivalently the variation in the aggregate transverse cross-sectional area of apertures 151A) across reflective wall 150A can advantageously provide relatively low fluid flow rate at locations relatively proximate to outlet transverse side 152A of main chamber 100 and relatively high fluid flow rate at locations relatively proximate to opposing transverse side 1526 of main chamber 100. The circular openings 151A illustrated in FIG. 2A all have the same size, but this is not necessary. Further, some or all of openings 151A illustrated in FIG. 2A may have different shapes.

In the FIG. 2B embodiment, reflective wall 150B comprises openings 151B that are generally rectangularly shaped. Reflective wall 150B may provide openings 151B with relatively large transverse cross-sectional areas at transverse locations of reflective wall 150B corresponding to opposing transverse side 152B of main chamber 100 (e.g. relatively distal from fluid outlet 111 and at the bottom of reflective wall 150B in the FIG. 2B view) and relatively small transverse cross-sectional areas at transverse locations of reflective wall 150B corresponding to outlet transverse side 152A of main chamber 100 (e.g. relatively proximate to fluid outlet 111 and at the top of reflective wall 150B in the FIG. 2B view). This variation in the transverse cross-sectional area of apertures 151B across reflective wall 150B can advantageously provide relatively low fluid flow rate at locations relatively proximate to outlet transverse side 152A of main chamber 100 and relatively high fluid flow rate at locations relatively proximate to opposing transverse side 152B of main chamber 100.

In the FIG. 2C embodiment, openings 151C have generally the same features as those of openings 151B, except that opening 151C' is shaped to provide regions of larger cross-sectional area at locations relatively distal from a transverse center axis 155 of reflective wall 150C and smaller cross-sectional areas at locations relatively proximate to center axis 155. Such design may be appropriate, for example, where fluid outlet 111 is located along center axis 155. Other openings 151C may be shaped to provide shapes similar to 151C' and/or other suitably shaped cross sections to have larger areas (and thereby provide relatively high fluid flow rate) at locations relatively distal from a transverse center axis 155 and have smaller areas (and thereby provide relatively low fluid flow rate) at locations relatively proximate to the transverse center axis 155.

It will be appreciated from the disclosure herein that openings 151 may be generally shaped, sized and/or located to provide relatively low fluid flow rate at locations relatively proximate to outlet transverse side 152A of main chamber 100 and relatively high fluid flow rate at locations relatively proximate to opposing transverse side 152B of main chamber 100 or to otherwise provide different fluid velocity profiles across reflective wall 150 and inside main chamber 100.

Auxiliary Reflectors

Reactor 10 of the FIG. 1 embodiment may comprise one or more auxiliary reflectors 160, which may be disposed, relative to reflective wall 150, to partially cover one or more openings 151 in reflective wall 150 and to provide additional reflection of at least some of the radiation from emitter 200 which would otherwise pass through openings 151, while still permitting fluid flow from inlet 110 into main chamber 100 through openings 151.

Figures 3A, 3B, 3C:
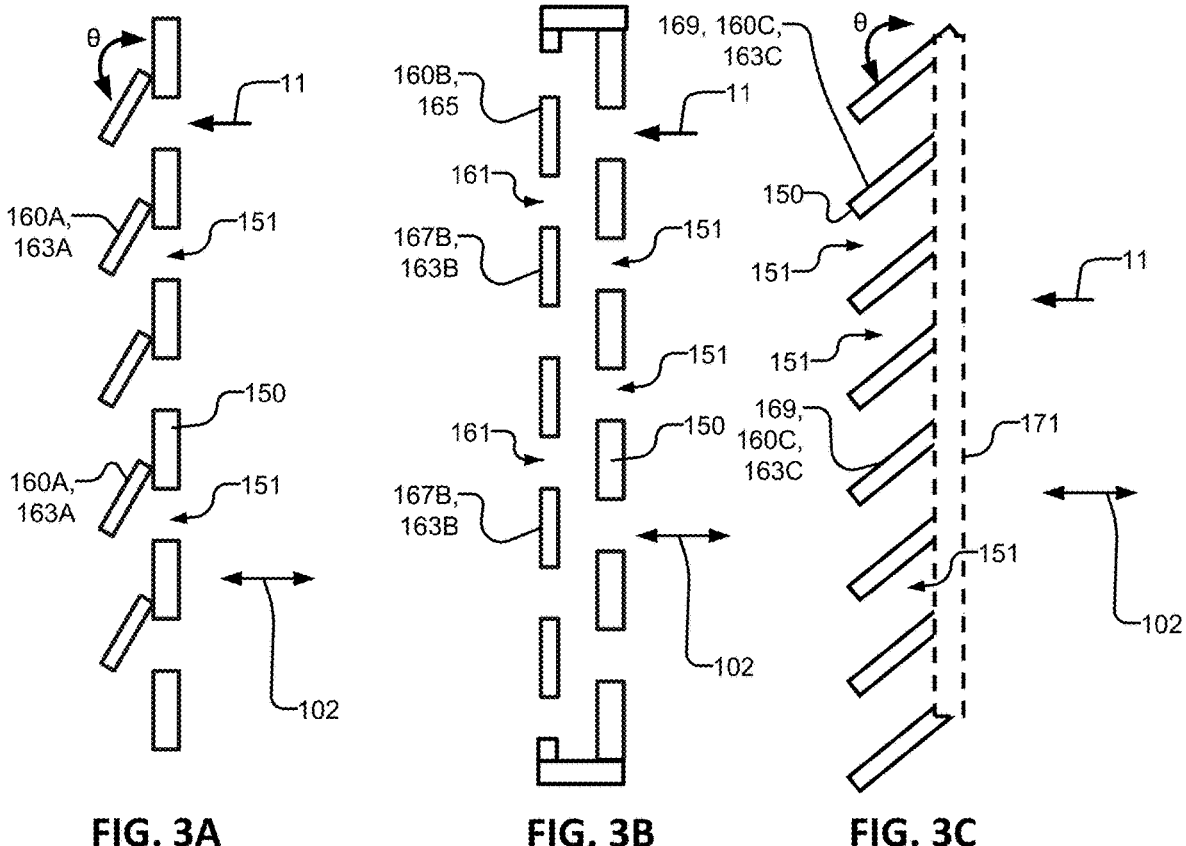
FIGS. 3A and 3B schematically depict example auxiliary reflectors disposed, relative to a reflective wall of the FIG. 1 UV reactor, to partially cover the openings in the reflective wall and to provide additional reflection of at least some of the radiation from the FIG. 1 emitter which would otherwise pass through the openings in the reflective wall.
FIG. 3C schematically depicts an example set of auxiliary reflectors provided in lieu of a reflective wall.

FIGS. 3A-C are schematic diagrams depicting side views of auxiliary reflectors 160A and 1608 according to example embodiments of the invention.

In the FIG. 3A example embodiment, a plurality of auxiliary reflectors 160A are provided, with each of auxiliary reflectors 160A extending at an angle θ away from reflective surface 153 of reflective wall 150 in a region of a corresponding opening 151. The angle θ at which each auxiliary reflector 160A extends away from reflective surface 153 may permit auxiliary reflector 160A to partially cover some of its corresponding opening 151, while permitting some fluid flow through opening 151 and between reflector 160A and reflective wall 150. In some embodiments, the angle θ between reflective wall 150 and auxiliary reflectors 160A may be in a range between 100° and 170°. Each of auxiliary reflectors 160A may comprise a reflective surface 163A which may be disposed to provide additional reflection of at least some of the radiation from emitter 200 which would otherwise (but for the presence of auxiliary reflector 160A) pass through openings 151. Such additional reflection may increase the radiation fluence on fluid in main chamber 100 and may mitigate the likelihood of fluid short circuiting through reactor 10. The angle θ at which auxiliary reflectors 160A are disposed relative to reflective wall 150 may be selected to balance trade-offs between the amount of fluid flow permitted from inlet 100 into main chamber 100 through openings 151 and the amount of UV radiation that can be reflected off of reflective surfaces 163A of auxiliary reflector 160A and back into chamber 100. Angle θ may be selected to control the distribution of angles of incidence of UV radiation impinging on reflective surfaces 163A of auxiliary reflector 160A. In some embodiments, auxiliary reflectors 160A are mounted to reflective wall 150 such that the angle θ is adjustable—e.g. user adjustable.

Auxiliary reflectors 160A in the illustrated embodiment of FIG. 3A have the same orientation as one another and a one-to-one correspondence with openings 151, but neither of these features are necessary. In some embodiments, some or all of auxiliary reflectors 160A may be disposed at different angles θ relative to reflective wall 150 or to a transverse direction that is orthogonal to longitudinal direction 102. In some embodiments, some of openings 151 are not covered by any auxiliary reflectors 160A and fluid is permitted to flow unobstructed through such openings 151. In some embodiments, more than one auxiliary reflector 160A is used to partially cover a single opening 151. In the illustrated embodiment of FIG. 3A, auxiliary reflectors 160A have generally planar surfaces, but this is not necessary. In some embodiments, reflective surfaces 163A (or other surfaces) of auxiliary reflectors 160A may have curvature. In some embodiments, a plurality of auxiliary reflectors 160A may be integrally formed or otherwise coupled to one another. In some embodiments, each auxiliary reflector 160A may be separate. In some embodiments, one or more auxiliary reflectors 160A may be integrally formed with or coupled to reflective wall 150 and/or to other parts of body 101. In some embodiments, one or more auxiliary reflectors 160A may be provided on a separate component or layer that is located in reactor 10. In the illustrated embodiment of FIG. 3A, auxiliary reflectors 160A are disposed such that the reflective surfaces 163A of auxiliary reflectors 150A are located downstream of reflective wall 150. In some embodiments, the reflective surfaces 163A of one or more auxiliary reflectors 160A are located upstream of reflective wall 150.

FIG. 3B shows an auxiliary reflector 160B according to another example embodiment. In the FIG. 3B example embodiment, auxiliary reflector 160B may be provided in the form of a secondary reflective wall 165 spaced apart in a longitudinal direction 102 from reflective wall 150. Secondary reflective wall 165 is shaped to provide secondary openings 161. At least some portions 167B of secondary reflective wall 165 are located to overlap (in longitudinal direction 102) with openings 151 in reflective wall 150, so that portions 167B cover at some of their corresponding openings 151, while permitting some fluid flow through opening 151, between reflective wall 150 and secondary reflective wall 165, through openings 161 and into the main chamber 100. Portions 167B of secondary reflective wall 165 may comprise reflective surfaces 163B which may be disposed to provide additional reflection of at least some of the radiation from emitter 200 which would otherwise (but for the presence of auxiliary reflector 160B) pass through openings 151. Such additional reflection may increase the radiation fluence on fluid in main chamber 100 and may mitigate the likelihood of fluid short circuiting through reactor 10.

Portions 167B of secondary reflective wall 165 in the illustrated embodiment of FIG. 3B have a one-to-one correspondence with openings 151, but this is not necessary. In some embodiments, some of openings 151 are not covered by any portions of auxiliary reflector 160B and fluid is permitted to flow unobstructed fluid through such openings 151. In some embodiments, more than one auxiliary reflector portion 167B is used to partially cover a single opening 151. In the illustrated embodiment of FIG. 3B, auxiliary reflector portions 167B are part of a secondary reflective wall 165. This is not necessary. In some embodiments, any or all of auxiliary reflector portion 167B may be separately embodied. In some embodiments, one or more auxiliary reflector portions 167B may be integrally formed with or coupled to reflective wall 150 and/or to other parts of body 101. In some embodiments, auxiliary reflector 160B may be provided on a separate component or layer that is located in reactor 10. In the illustrated embodiment of FIG. 3B, auxiliary reflector 160B is disposed located downstream of reflective wall 150. In some embodiments, auxiliary reflector 160B is located upstream of reflective wall 150. Openings 161 in the illustrated embodiment of FIG. 3B are evenly spaced, but this is not necessary. In other embodiments, some or all of openings 161 are spaced apart at different distances. Openings 161 may optionally have different sizes and/or shapes in some embodiments. In some embodiments, some of openings 151 in reflective wall 150 are aligned with openings 161 in auxiliary reflector 160B to allow unobstructed fluid flow therethrough.

Other embodiments of the invention may provide one or more auxiliary reflectors 160 comprising a combination of the features of auxiliary reflectors 160A and 160B. For example, some openings 151 may be partially covered by auxiliary layers 160A while other openings 151 may be covered by auxiliary layers 160B.

In some embodiments, reflective wall 150 itself may be provided by one or more reflective members 169 supported to provide one or more corresponding reflective surfaces 163C oriented at an angle θ with respect to a transverse direction that is orthogonal to longitudinal direction 102. Reflective members 169 may be similar to auxiliary reflectors 160A of the FIG. 3A embodiment and may also be referred to herein as auxiliary reflectors 160C. Reflective members 169 may define fluid flow openings 151 therebetween. Reflective members may be supported in reactor 10 by supports 171 (shown in dashed lines in FIG. 3C). In some embodiments, reflective members 169 are supported such that the angle θ is adjustable—e.g. user adjustable.

The reflective surfaces 163A, 1638, 163C (collectively, reflective surfaces 163) of auxiliary reflectors 160A, 160B, 160C (collectively, auxiliary reflectors 160) may, in some embodiments, be primarily diffusively reflective at the wavelengths of the radiation sources used in emitter 200. In some non-limiting embodiments, the radiation sources used in emitter 200 may comprise UV-LED sources in the UV-C range (e.g. wavelengths on the order of 250-290 nm) and the reflective surface 163 of auxiliary reflectors 160 may be primarily diffusively reflective at these UV-C wavelengths. This is not necessary, however, and reflective surfaces 163 may be specularly reflective. In some embodiments, reflective surface 163 may be coated with or be otherwise covered by or otherwise comprise a UV-enhanced and/or UV-protective coating material (e.g. dielectrics, fluorine based compounds, etc.). In some embodiments, the reflective surfaces 163 of auxiliary reflectors 160 are coated with or otherwise comprise suitable UV-transparent materials for protecting the surfaces from oxidation, corrosion, etc. In some embodiments, the reflective surfaces 163 of auxiliary reflectors 160 are coated with or otherwise comprise a UV-transparent biocompatible material. For the purposes of this disclosure, unless the context dictates otherwise, references to the reflective surface of an auxiliary reflector should be understood to include the reflective surface of the auxiliary reflector covered by any such protective, UV-enhanced and/or biocompatible material, where present.

Reflector Cone

FIGS. 4A-D schematically illustrate non-limiting example constructions for reflector cones 250A-D (collectively, reflector cones 250), which may be used in various embodiments of the FIG. 1 reactor 10. Each of reflector cones 250 illustrated in the embodiments of FIGS. 4A-4D are shaped to define a corresponding reflector cone concavity 253A-D (collectively, reflector cone cavities 253). Reflector cones 250 may be shaped to define reflector cone cavities 253 having larger transverse cross-sectional areas (e.g. cross-sections on planes orthogonal to a principal emission axis 211 of radiation source 210 (which coincides with longitudinal direction 102 in FIG. 1) at locations relatively further away from their respective radiation source 210 along principal emission axis 211 and/or longitudinal direction 102 and smaller transverse cross-sectional areas at locations relatively closer to their respective radiation source 210 along principal emission axis 211 and/or longitudinal direction 102. The surfaces of reflector cones 250 which define reflector cone cavities 253 may be coated with or otherwise comprise a material that is reflective to radiation emitted by their respective emitters 200.

In the example embodiments of FIGS. 4A-4D, UV radiation source 210 may comprise a UV-LED emitting UV radiation with a principal emission axis 211. UV-LED 210 may be soldered to or otherwise fabricated as part of a printed circuit board (PCB) in some embodiments. In the FIG. 4A example embodiment, reflector cone 250A comprises an ellipsoidally shaped reflective surface to direct UV radiation emitted from source 210 to a desired spot located away from source 210. In the FIG. 4B example embodiment, reflector cone 250B comprises a zonal shaped reflective surface. In the FIG. 4C example embodiment, reflector cone 250C comprises a hyperboloidal shaped reflective surface. In the FIG. 4D example embodiment, reflector cone 250D comprises a paraboloidically shaped reflective surface to collimate UV radiation emitted from source 210. The reflector cone used in the FIG. 1 reactor 10 is not limited to those shown in FIGS. 4A-4D. In some embodiments, various combinations of the reflector cone shapes shown in FIGS. 4A-4D may be used in the FIG. 1 reactor 10. In some embodiments, the reflector cone used in the FIG. 1 reactor 10 may comprise a free-form shape fabricated from UV-reflective material.

Reflector cone 250 may generally comprise a reflective surface having any of the above-mentioned shapes (e.g. paraboloidic, ellipsoidal, zonal, hyperboloidal etc.). In some embodiments, reflector cone 250 may comprise a reflective surface having a combination of any two or more of the above-mentioned shapes (e.g. paraboloidic, ellipsoidal, zonal, hyperboloidal, etc.) and/or pluralities of the same family of shapes but with different parameters to selectively control the radiation distribution of emitter 200.

For example, reflector cone 250 may comprise a reflective surface that is partially paraboloidic shaped and partially ellipsoidally shaped, such that reflector cone 250 is paraboloidic over a first range of azimuthal and/or polar angles and ellipsoidal over a second range of azimuthal and/or polar angles. The pattern may be repeated in some embodiments so that the reflective surface of reflector cone 250 alternates between being paraboloidically shaped and being ellipsoidally shaped across different ranges of azimuthal and/or polar angles. As another example, reflector cone 250 may comprise a reflective surface that has a first paraboloidic portion with a first focal parameter over a first range of azimuthal and/or polar angles and that has a second paraboloidic portion with a second focal parameter over a second range of azimuthal and/or polar angles.

Controlling the radiation distribution of emitter 200 (using a reflector cone 250 having a desirably shaped reflector surface) can enhance the uniformity of the UV fluence rate distribution and/or the total UV coverage inside main chamber 100. Providing a relatively uniform UV fluence rate distribution and/or increasing total UV coverage can advantageously enhance the overall performance of reactor 10 (e.g. by increasing dose uniformity delivered to liquid traversing reactor 10 and/or mitigating short circuiting of liquid through reactor 10). For example, providing a relatively uniform UV fluence rate distribution may be desirable in embodiments where fluid flow inside main chamber 100 is relatively uniform. In contrast, controlling the radiation distribution of emitter 200 (using a reflector cone 250 having a desirably shaped reflector surface) to provide higher and lower UV fluence rate distribution at different locations inside main reactor chamber 100 may be desirable in embodiments where fluid flow inside main reactor chamber 100 is non uniform. In such embodiments, a relatively higher UV fluence rate distribution may be provided at locations inside main chamber 100 where fluid 12 has a relatively higher velocity while a relatively lower UV fluence rate distribution may be provided at locations inside main chamber 100 where fluid 12 has a relatively lower velocity.

FIGS. 5A-E illustrate radiation patterns emitted by an emitter 200 comprising a UV-LED 210 located in reflector cones 250D-250I (also collectively referred to herein as reflector cones 250) having different reflective surface shapes which may be used in example embodiments of reactor 10 (see FIG. 1). The density of black spots in FIGS. 5A-E is proportional to the fluence rate of emitter 200, where darker shadings correspond to higher fluence rates. In the FIGS. 5A-5C example embodiments, reflector cones 250D, 250G and 250F have reflective surfaces that are respectively ellipsoidally shaped, paraboloidically shaped and hyperboloidically shaped to generate corresponding radiation profiles in a space 103 in front of UV transparent window 220. Space 103 may correspond to a volume wholly or partly contained within main chamber 100.

Figures 5A, 5B, 5C:
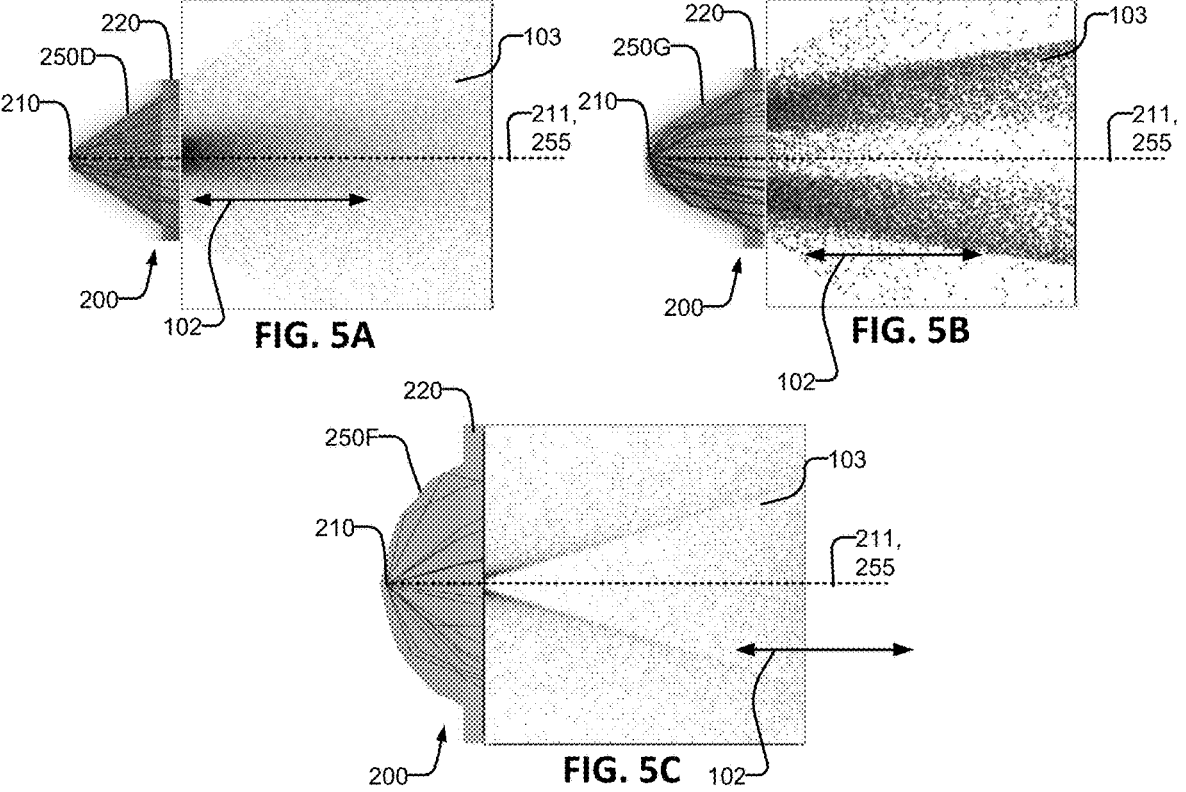
FIGS. 5A-E illustrate radiation patterns emitted by an emitter comprising a UV-LED located in reflector cones having different reflective surface shapes which may be used in example embodiments of the FIG. 1 reactor.
Figures 5D, 5E:
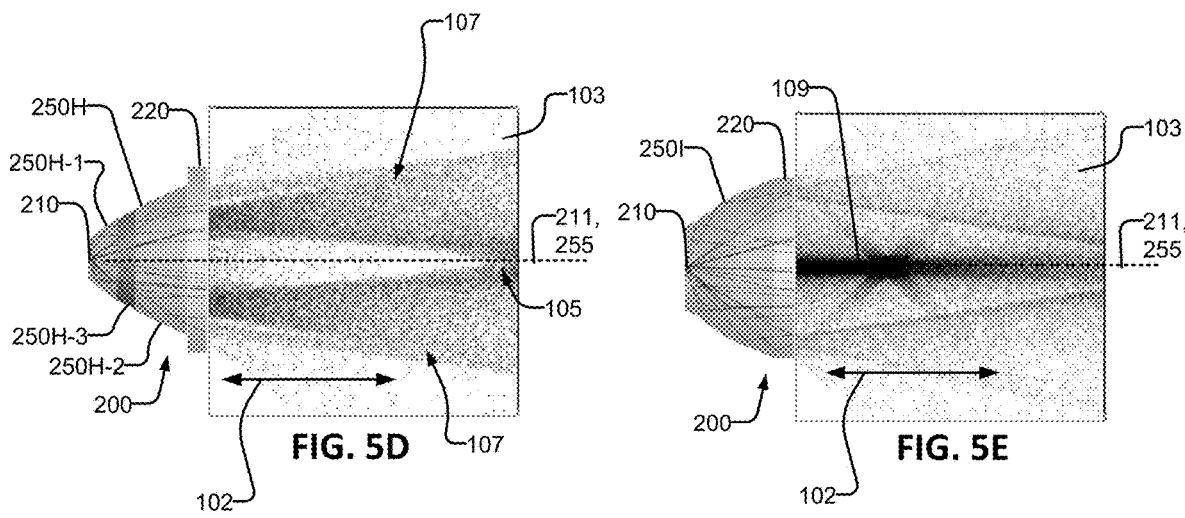

In the FIG. 5D example embodiment, hybrid reflector cone 250H is partially paraboloidic and partially ellipsoidal to enhance the uniformity of the radiant fluence rate distribution in space 103. Specifically, reflector cone 250H of the FIG. 5D embodiment comprises an ellipsoidally shaped reflective surface portion 250H-3 located between a first paraboloidically shaped reflective surface portion 250H-1 (most proximate to radiation source 210) and a second paraboloidically shaped reflective surface portion 250H-2 (distal from radiation source 210). The axes of symmetry of the first paraboloidically shaped surface portion 250H-1, the second paraboloidically shaped surface portion 250H-2 and/ or the ellipsoidally shaped surface portion 250H-3 may be coincident at a central axis 255. Central axis 255 may also coincide with the principal optical emission axis 211 of emitter 200 and/or UV-LED 210. Compared to a purely paraboloidic reflector 250G (FIG. 5B), hybrid reflector cone 250H advantageously increases the radiation fluence rate at a region 105 around of central symmetry axis 255 at a location spaced apart from emitter 200. Compared to a purely ellipsoidal reflector 250D (FIG. 5A), hybrid reflector cone 250H advantageously increases the radiation fluence rate at regions 107 spaced transversely apart from symmetry axis 255.

In the FIG. 5E example embodiment, free-form reflector cone 250I is formed by joining different shapes across different azimuthal and polar angles. Such shapes and different angles may be optimized (e.g. using a combination of simulation together with a computational optimization process) to provide a radiation fluence rate profile that has relatively high radiation fluence rate in a region 109 along central axis 255 and mitigates dead zones along central axis 255.

FIGS. 6A-H illustrate radiation patterns emitted by an emitter 200 comprising a UV-LED 210 located in reflector cones 250 having different reflective surface shapes which may be used in example embodiments of reactor 10 (see FIG. 1) together with a reflective surface 260 spaced apart from emitter 200 which simulates reflective wall 150 (and/or auxiliary reflectors 160) of the reactor 10. The density of black spots in FIGS. 6A-H is proportional to the fluence rate of emitter 200, where darker shadings correspond to higher fluence rates. Reflective surface 260 may have reflective properties similar to those of reflective wall 150 and/or auxiliary reflectors 160 which are to be simulated by reflective surface 260.

Figures 6A, 6B, 6C:
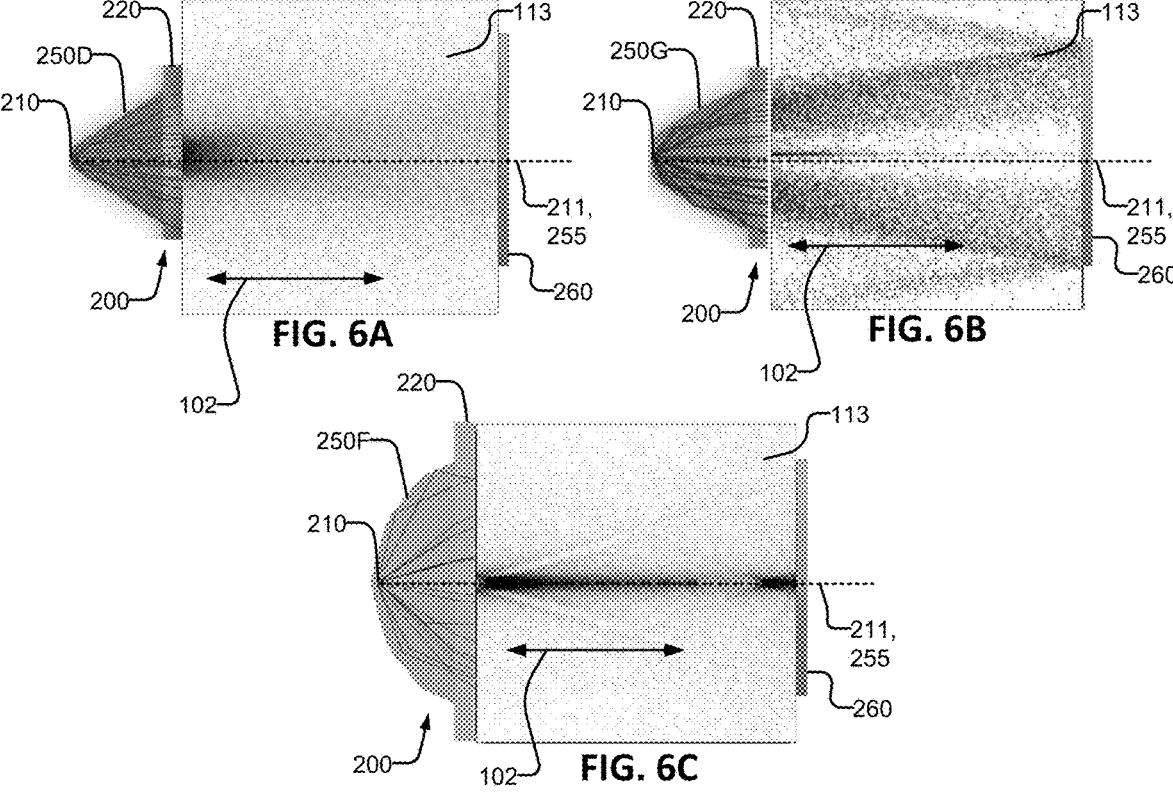
FIGS. 6A-H illustrate radiation patterns emitted by an emitter comprising a UV-LED located in reflector cones having different reflective surface shapes which may be used in example embodiments of the FIG. 1 reactor together with a reflective surface spaced apart from the emitter which simulates the reflective wall of the FIG. 1 reactor.

In the FIGS. 6A-6C example embodiments, reflector cones 250D, 250G and 250F have reflective surfaces that are respectively ellipsoidal shaped, paraboloidically shaped and hyperboloidically shaped to help emitter 200 generate corresponding radiation profiles in a volume 113 between UV transparent window 220 and reflective surface 260. Volume 113 may correspond to an area wholly or partly contained within main chamber 100.

Figures 6D, 6E:
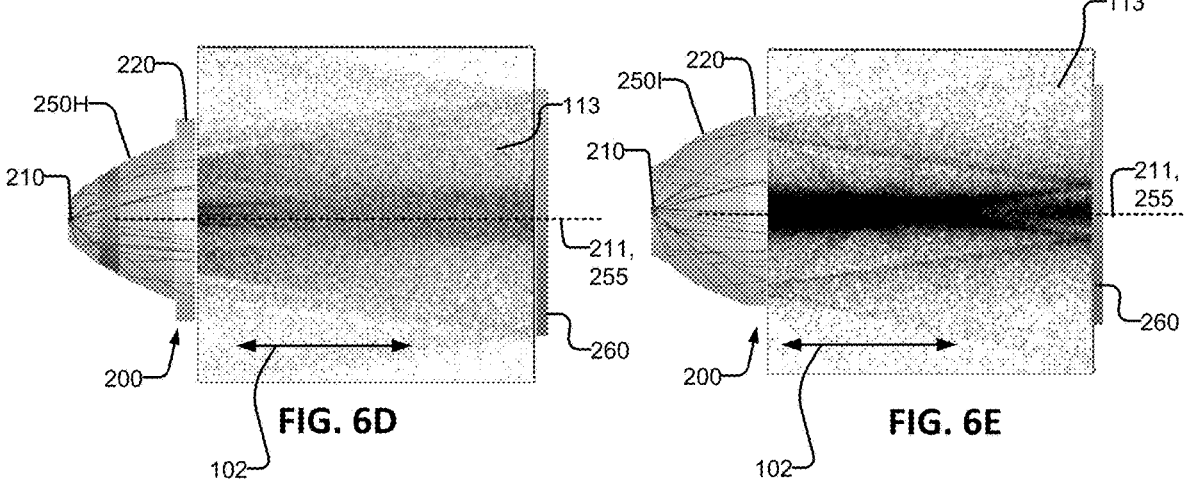

FIGS. 6D and 6E illustrate hybrid reflector cones 250H and 250I which are the same as those shown in FIGS. 5D and 5E. FIGS. 6D and 6E illustrate the effects of providing a reflective surface 260 spaced apart across volume 113 from emitter 200. UV radiation impinging on reflective surface 260 is reflected back into volume 113 and may mitigate dead zones, further enhance the radiant fluence rate uniformity, further enhance the radiant fluence rate along central axis 255 or otherwise provide desirable radiation characteristics. As can be seen by comparing FIG. 5D to FIG. 6D, reflective surface 260 can advantageously help provide a relatively uniform radiant fluence rate distribution at locations in front of central portion of volume 113 transversely bounded by the widest transverse portion of reflective cone 250H. Similarly, comparing FIG. 5E to FIG. 6E illustrates that reflective surface 260 has the effect of further increasing radiation fluence rate for reflective cone 250I in a volume around central axis 255.

Figures 6F, 6G, 6H:
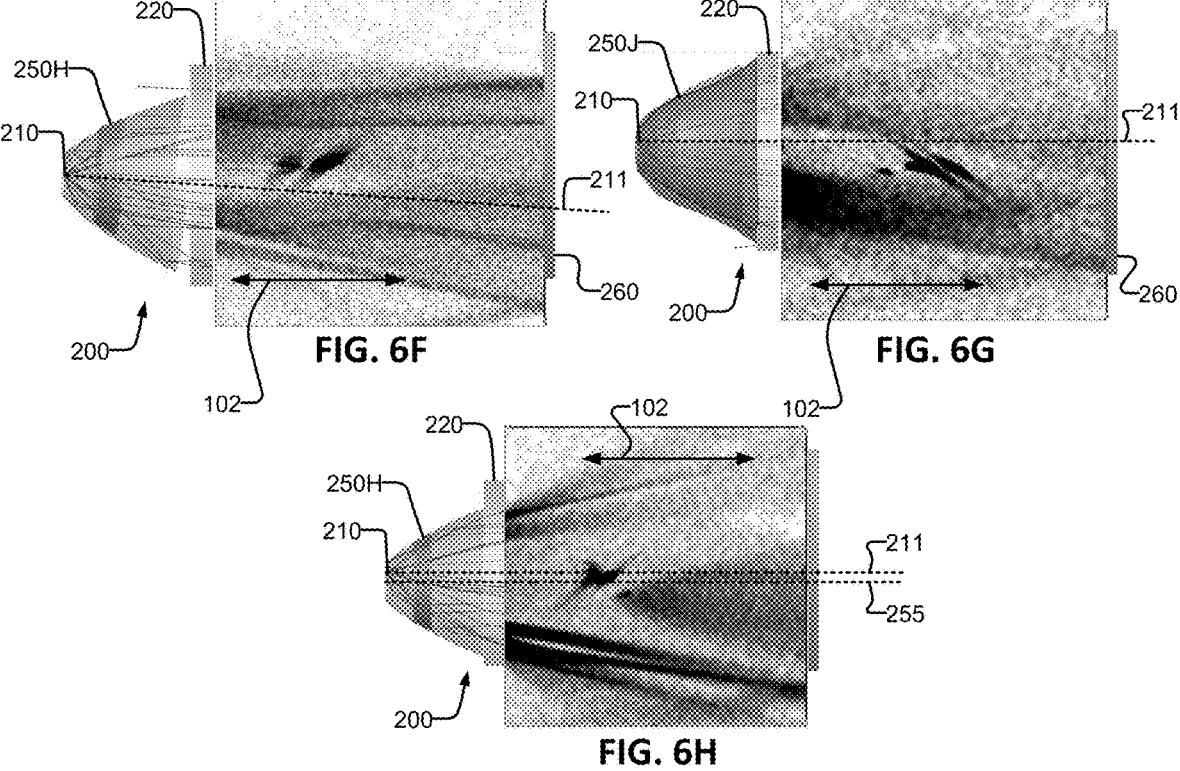

FIGS. 6F-H illustrate radiation patterns for further example design variations to emitter 200 for generating various non-symmetrical radiation profiles. In the FIG. 6F example embodiment, hybrid reflector 250H is oriented so that its principal optical emission axis 211 is oriented at a non-orthogonal (oblique) angle to reflective surface 260. In the FIG. 6G example embodiment, irregular-shaped reflector cone 250J is non-symmetric about a principal optical emission axis 211 of UV-LED 210. In the FIG. 6H example embodiment, central axis 255 of hybrid reflector cone 250H is parallel to, but not coaxial with, principal optical axis 211 of UV-LED 210. Central axis 255 and principal optical axis 211 are parallel in the FIG. 6H illustration, but this is not necessary.

In some embodiments, reflector cone 250 is fabricated from or otherwise comprises thermally conductive material that is thermally connected to UV-LED 210 or to a PCB (not shown) on which UV-LED is fabricated or mounted. In some embodiments, reflector cone 250 may extend in longitudinal direction 102 into the main chamber of a reactor where it may contact fluid 11 (see the extension of reflector cone 250 into main chamber 700 in reactor 70D of the FIG. 7D embodiment). This extension of reflector cone 250 into the main chamber may allow heat generated by UV-LED 210 to transfer to fluid 11 flowing through the main chamber. Such configuration can advantageously eliminate the need for a separate heat sink (or reduce the size of the separate heat sink) for UV-LED 210.

Reflector cone 250 may be coated with a material at portions 251 in contact with liquid 11 (see FIG. 7D) that is safe for contacting drinking water.

Figures 9A, 9B:
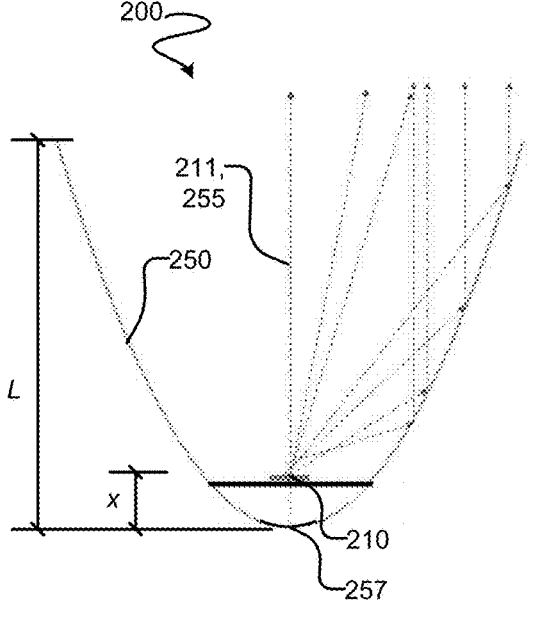
FIGS. 9A-C are schematic diagrams depicting example radiation patterns emitted by an emitter located at various locations in relation to a vertex of a reflector cone.
Figure 9C:
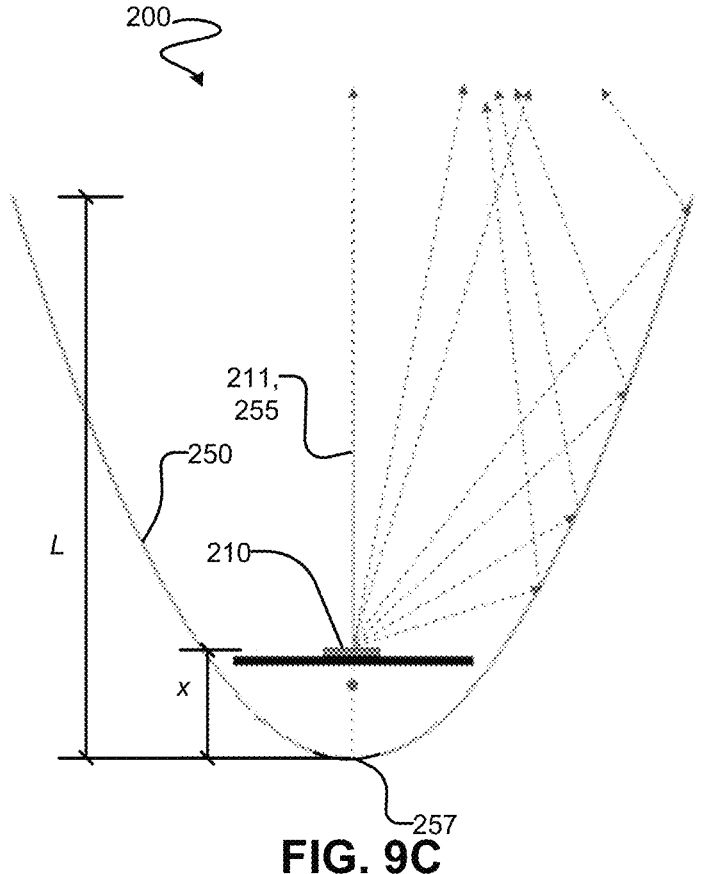

Referring to FIGS. 9A-9C, in some embodiments, reflector cone 250 may be defined as having an apex 257 located at its maximal concavity. Apex 257 may be located on one or both of principal optical emission axis 211 and symmetry axis 255. In some embodiments, reflector cone 250 may be truncated such that it does not have a singular apex. In such embodiments, apex 257 may be considered to be a location on the truncation plane that is on one or both of principal optical emission axis 211 and symmetry axis 255. A length L of the reflector cone 250 may be defined to be the maximal distance between apex 257 and the edge(s) of the reflector cone 250 (see FIGS. 9A-9C)—e.g. a longitudinal depth of the reflector cone 250. A distance x may be defined to be the distance of UV-LED 210 from apex 257. A parameter $\Delta = x/L$ may then be defined and used to characterize a relationship between the placement of UV-LED 210 and the shape of reflector cone 250. In some embodiments, A is in a range of $0.0 \leq \Delta \leq 0.6$. In some embodiments, this range is $0.0 \leq \Delta \leq 0.4$. In some embodiments, as shown in FIG. 9A, the parameter x is selected such that UV-LED 210 is positioned at or near a focal point of reflector cone 250, which may help emitter 200 to provide relatively collimated radiation. In some embodiments, as shown in FIG. 9B, UV-LED 210 is positioned at a distance x which is closer (than shown in FIG. 9A) to apex 257. This configuration may help emitter 200 to provide a diverging radiation pattern. In some embodiments, as shown in FIG. 9C, UV-LED 210 is positioned at a distance x which is further (than shown in FIG. 9A) from apex 257. This configuration may help emitter 200 to provide a converging radiation pattern.

FIGS. 7A-H are schematic longitudinally oriented cross-section views of other example UV reactors 70A, 70B, 70C, 70D, 70E, 70F, 70G, 70H (collectively, reactors 70) according to other example embodiments. UV reactors 70 are similar in many respects to UV reactor 10 (FIG. 1) described elsewhere herein and, unless specifically described as being different, UV reactors 70 may comprise any of the features described herein for UV reactor 10. Similarly, reactor 10 (FIG. 1) may be suitably modified to incorporate any of the features of reactors 70 described herein.

Figures 7A, 7B:
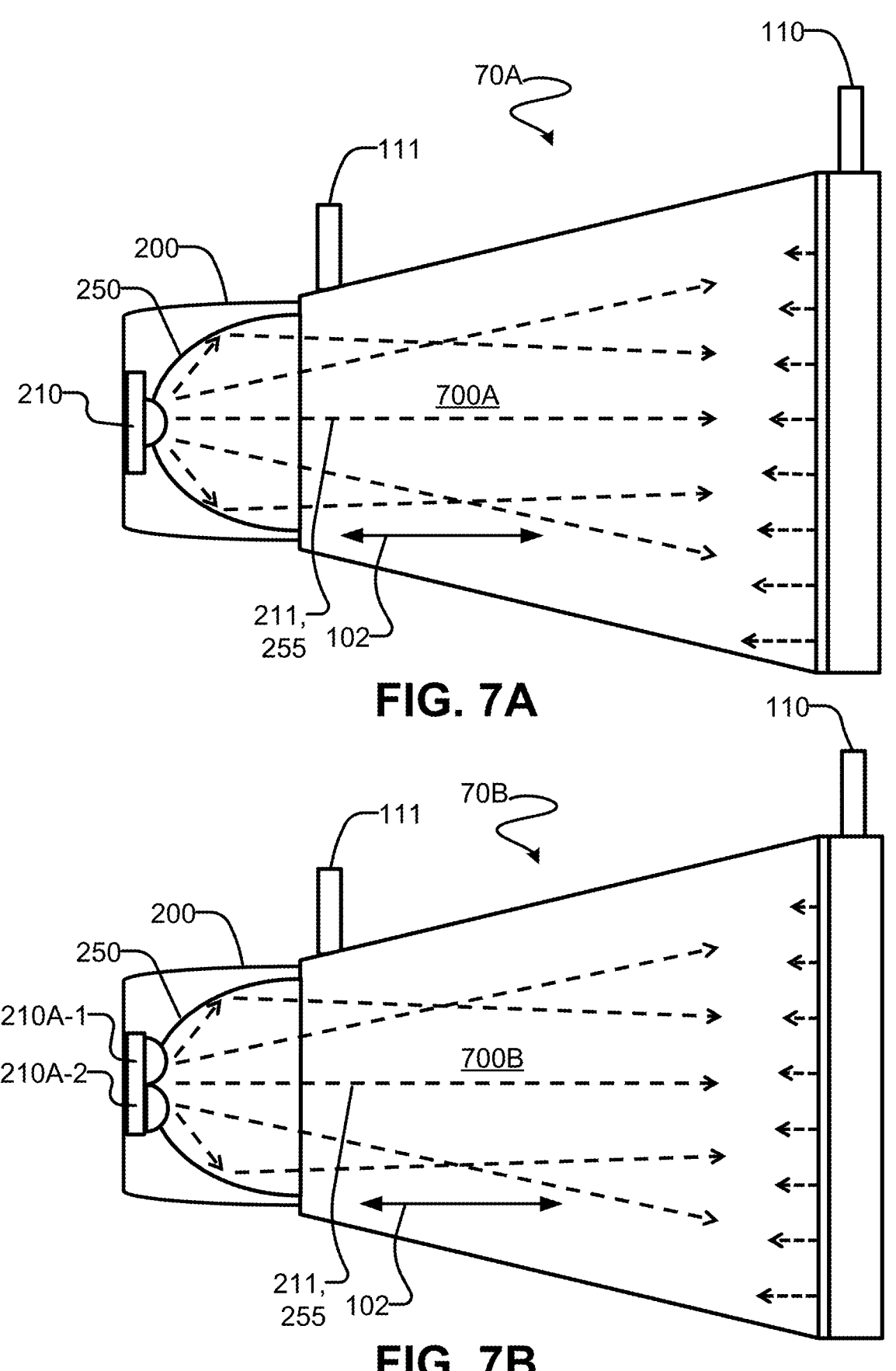
FIGS. 7A-H are schematic longitudinally oriented cross-section views of UV reactors comprising UV emitters generally oriented in a single emission direction (e.g. a longitudinal direction) according to a number of example embodiments.

Reactor 70A of the FIG. 7A embodiment comprises features similar to those of reactor 10, except that main chamber 700A is shaped differently from main chamber 100. More specifically, main chamber 700A has the general shape of a truncated cone (frustro-conical), which may be suitably designed to accommodate various fluid velocity and/or UV radiation profiles within main chamber 700A. Reactor 70A could be designed to have other shapes for main chamber 700A. For example, possible shapes of main chamber 700A include, but are not limited to: shapes more similarly to main chamber 100 of reactor 10, cylindrical shapes, ellipsoidal shapes and rectangular shapes. UV reactor 70A comprises a single UV emitter 200, a main chamber 700A and reflective wall 150A. UV emitter 200 is oriented with a principal optical emission axis 211 oriented in a longitudinal direction 102 to direct radiation into a main chamber 700.

Reactor 70B of the FIG. 7B embodiment comprises features similar to those of reactor 10 (FIG. 1) and/or reactor 70A described elsewhere herein, except that emitter 200B of reactor 70B comprises radiation sources including radiation sources 210A-1, 210A-2 and other radiation sources (not shown) arranged in a 2×2 array. The dimensions of reflector cones 250 can be optimized in some embodiments to accommodate arrays comprising pluralities of radiation sources 210 in some embodiments. Such pluralities of radiation sources may have a variety of spatial orientations. In some embodiments, such pluralities of radiation sources may be oriented symmetrically about a symmetry axis 255 (or principal optical emission axis 211) that may extend in longitudinal direction 102, although this is not necessary. Example configurations of radiation sources 210 include, but are not limited to, surface mount devices (SMDs), chip on board (COB) arrays of various dimensions, LED packages of various dimensions, other types of emitters with p-n junctions including those based on metal nitrides and/or the like.

Figure 7C:
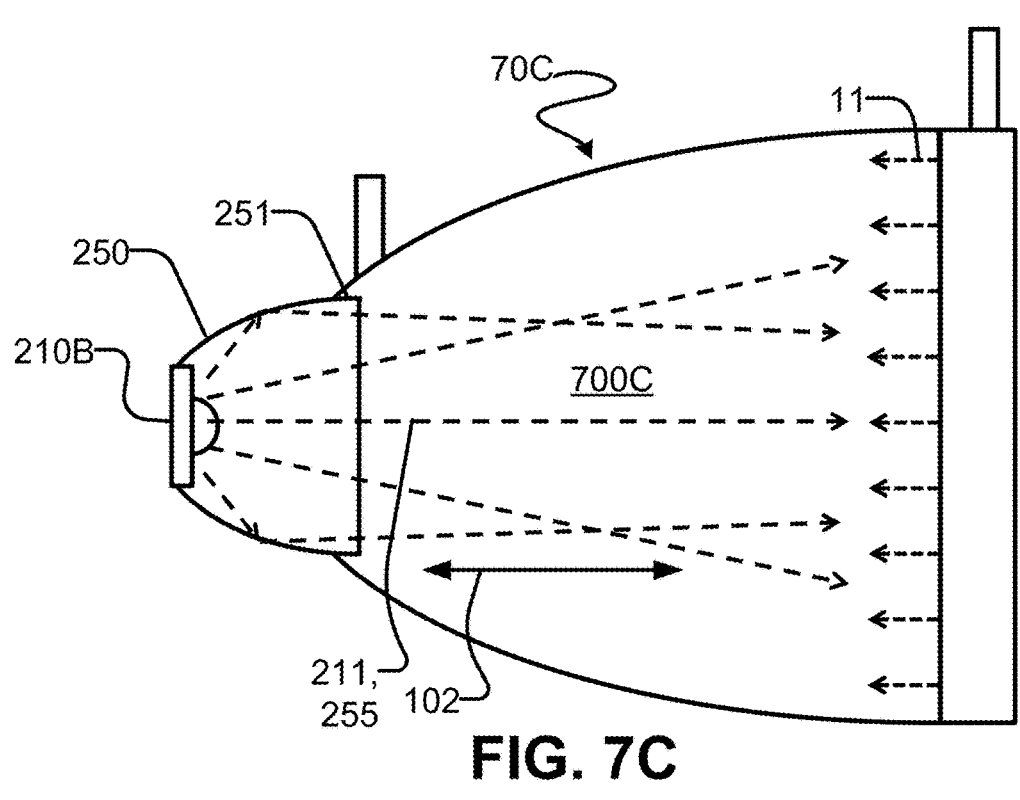

Reactor 70C of the FIG. 7C embodiment comprises features similar to those of reactor 10 (FIG. 1). Reactor 70C differs from reactor 10 in that reactor 70C comprises a reflector cone comprising portions 251 that extends into chamber 700.

Figure 7D:
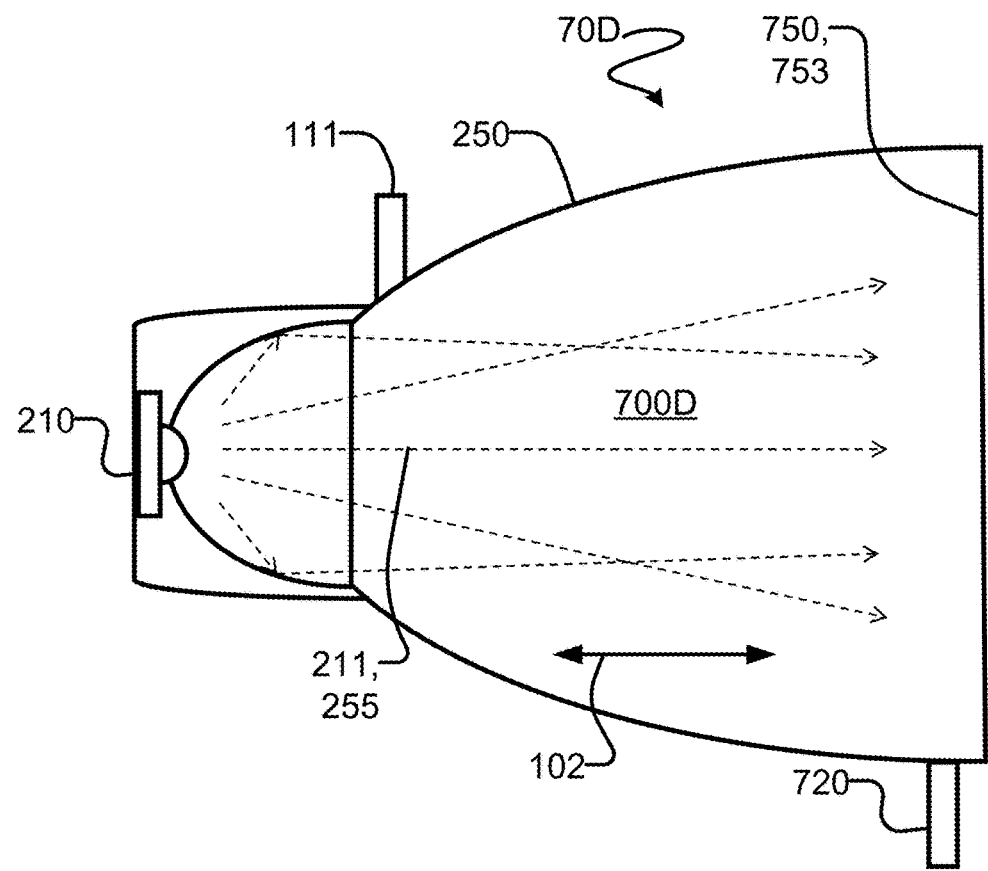

Reactor 70D of the FIG. 7D embodiment comprises features similar to those of reactor 10 (FIG. 1). Reactor 70D differs from reactor 10 in that reactor 70D comprises a reflective wall 750 without openings 151 through which fluid may travel—i.e. reflective wall 750 of the FIG. 7D embodiment may comprise a solid planar reflective surface 753. To facilitate this configuration of reflective wall 750, reactor 70D may comprise one or more inlets 720 which is in fluid communication with main chamber 700D (e.g. closer in the longitudinal direction to LED 210 than reflective wall 750). In some embodiments, inlet 720 may be provided on a transversely opposing side of reactor 70D from outlet 111.

Figures 7E, 7F:
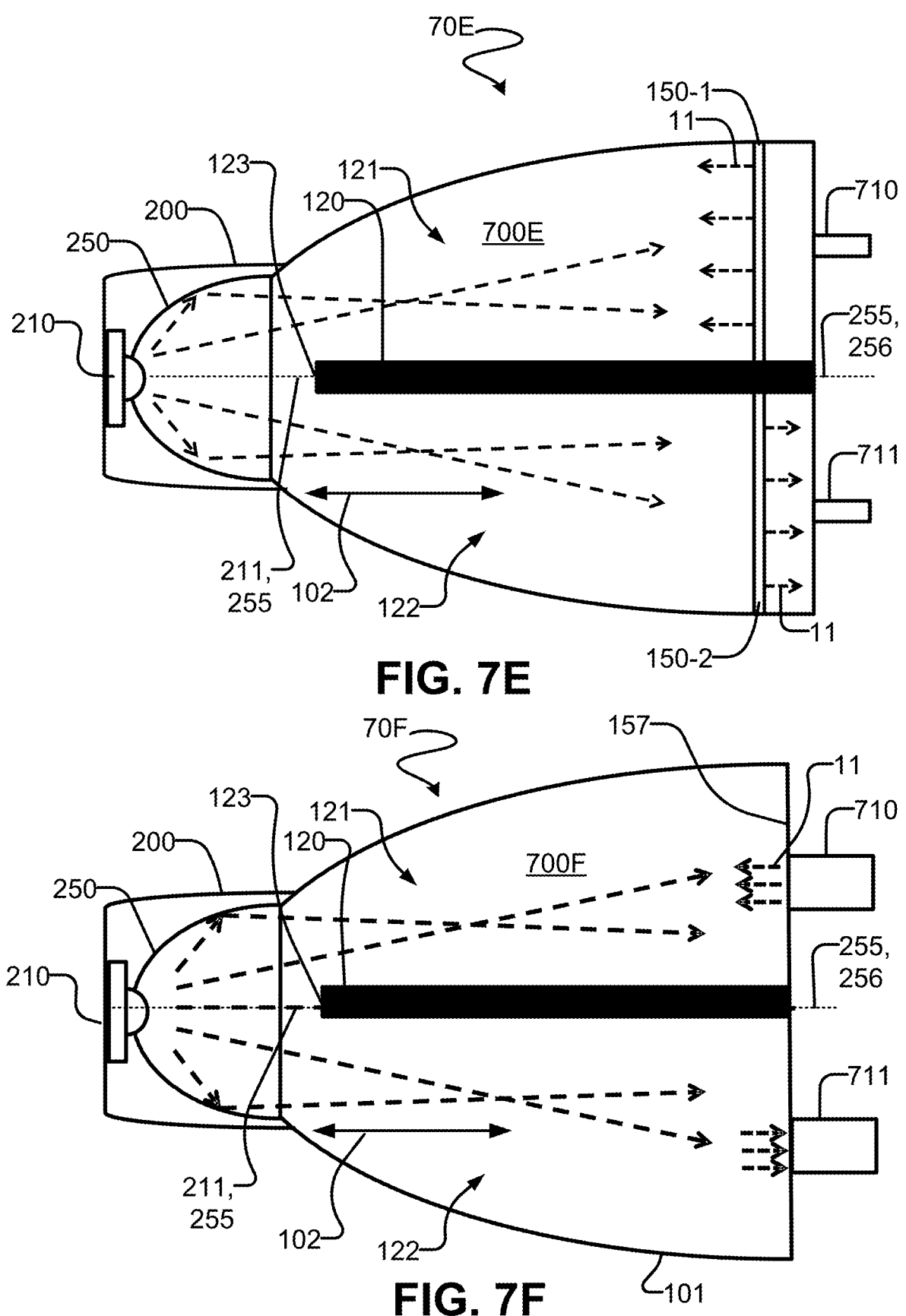

Reactor 70E of the FIG. 7E embodiment comprises features similar to those of reactor 10 (FIG. 1). Reactor 70E comprises an inlet 710 and an outlet 711 that are at different locations (as compared to inlet 110 and outlet 111 of reactor 10) and a main chamber 700E which comprises a longitudinally extending divider 120 positioned in main chamber 700E along symmetry axis 255 to create an inlet channel 121 and an outlet channel 122. Divider 120 may be located along the central axis 255 of reflector cone 250 and/or principal optical axis 211 of emitter 200. In some embodiments, fluid 11 enters inlet channel 121 through fluid inlet 710 and a portion 150-1 of reflective wall 150 located on one transverse side of divider 120, flows around longitudinal end 123 of divider 120 and flows back through outlet channel 122 and through a second portion 150-2 of reflective wall 150 located on the other transverse side of divider 120 to fluid outlet 711. Reflective wall 150 of reactor 70E comprises a reflective wall portion 150-1 located between fluid inlet 710 and inlet channel 121 and a reflective wall portion 150-2 located between fluid outlet 711 and outlet channel 122.

Reactor 70F of the FIG. 7F example embodiment comprises features that are similar to those of reactor 70E, except that reactor 70F does not comprise reflective wall 150 which is present in reactor 70E. Fluid 11 enters inlet channel 121 from fluid inlet 710, flows around longitudinal end 123 of divider 120, flows back through outlet channel 122 and exits outlet channel 122 from fluid outlet 711. In some embodiments, wall 157 defining main chamber 700F at which inlet 710 and outlet 711 is non-reflective. Optionally, however, wall 157 can be reflective. Reactor 70F embodiments (particularly those with non-reflective wall 157) may be advantageous where cost is an important consideration. For example, compared to the example embodiment shown in FIG. 7E comprising a reflective wall 150 having a number of openings, reactor 70F embodiments (particularly those where wall 157 is non-reflective) are generally less expensive to manufacture. Furthermore, the use of a non-reflective wall 157 provides greater design flexibility in selecting a desired material for reactor body 101. Various velocity profiles for fluid 11 may be accommodated by varying different parameters of inlet 710 and outlet 711 (e.g. position and dimensions of openings).

Figure 7G:
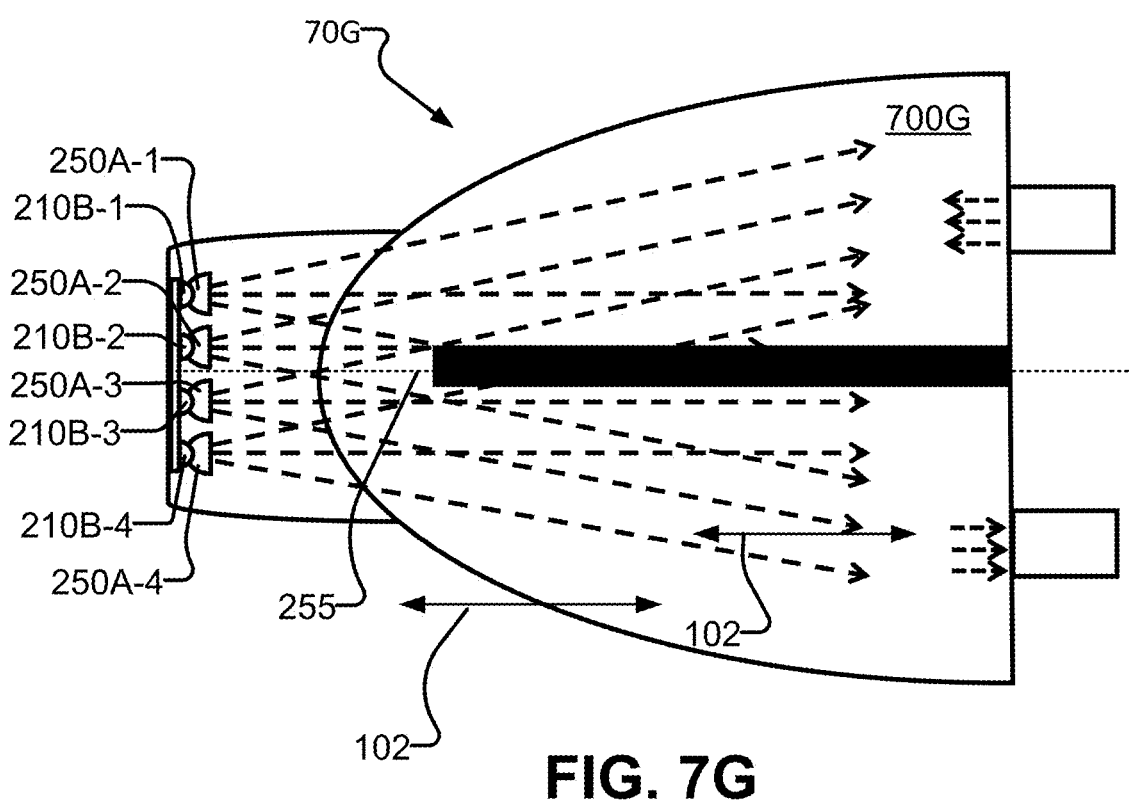

Reactor 70G of the FIG. 7G example embodiment comprises features that are similar to those of reactor 70F, except that reactor 70G comprises multiple radiation sources 210B-1, 210B-2, 210B-3, 210B-4 . . . (collectively, radiation sources 210B), each radiation source 2108 comprising a corresponding reflector cone 250A-1, 250A-2, 250A-3, 250A-4 . . . (collectively, reflector cones 250A). Reflector cones 250A operate according to the principle of reflector cone 250 to focus, direct and/or collimate UV radiation emitted by radiation sources 210B Reflector cones 250A may comprise any of the different embodiments and features of reflector cone 250 described herein. In the illustrated embodiment, reactor 70G may comprise a four by four array of radiation sources 210B and reflector cones 250A, although other numbers and arrangements of radiation sources 210B and reflector cones 250A are possible. FIGS. 12A-12D show non-limiting examples of other numbers and arrangements of radiation sources 210B and reflector cones 150A.

Having multiple radiation sources 210B can advantageously enhance the UV fluence rate inside main chamber 700G as well as improve the uniformity of dose delivered to fluid 11 passing through reactor 70G, both of which may be advantageous features as described herein. In general, the radiation sources 210B of reactor 70G shown in FIG. 7G are oriented such that their principal radiation axes are longitudinally oriented (i.e. in direction 102 parallel with central axis 255). In general, however, the plurality of radiation sources 210B may have a variety of spatial orientations.

Any of the embodiments shown or described herein having single radiation sources or multiple radiation sources with single reflective cones can be modified in a manner similar to the embodiment of FIG. 7G to replace their corresponding radiation sources and reflective cones with a plurality of radiation sources, each radiation source having a corresponding reflector cone.

Figure 7H:
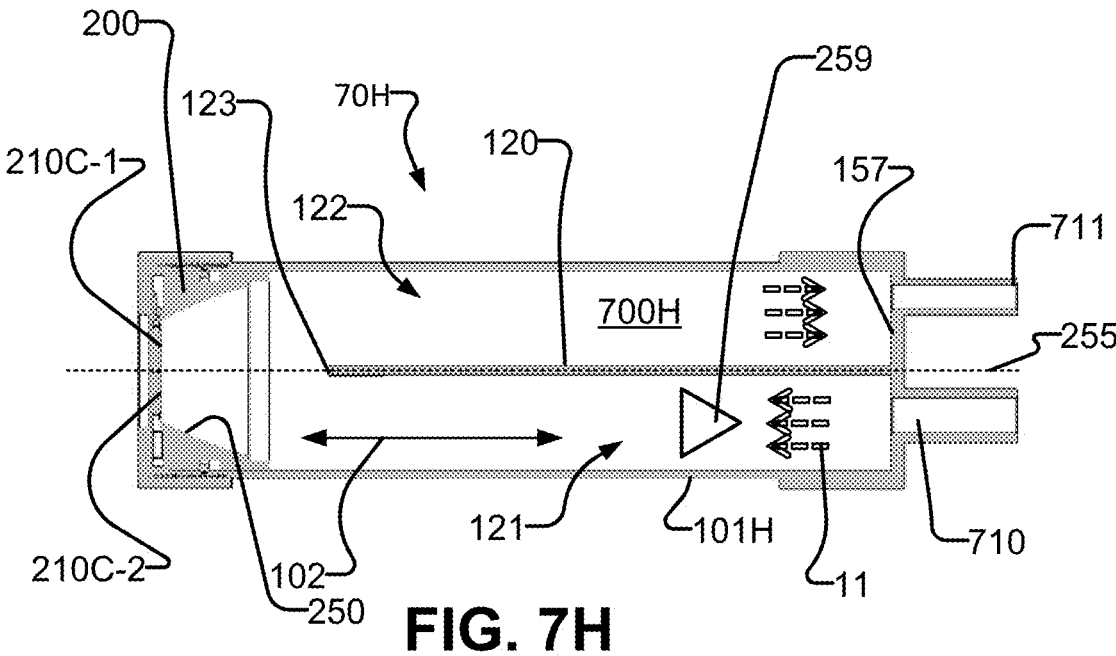
Figure 7I:
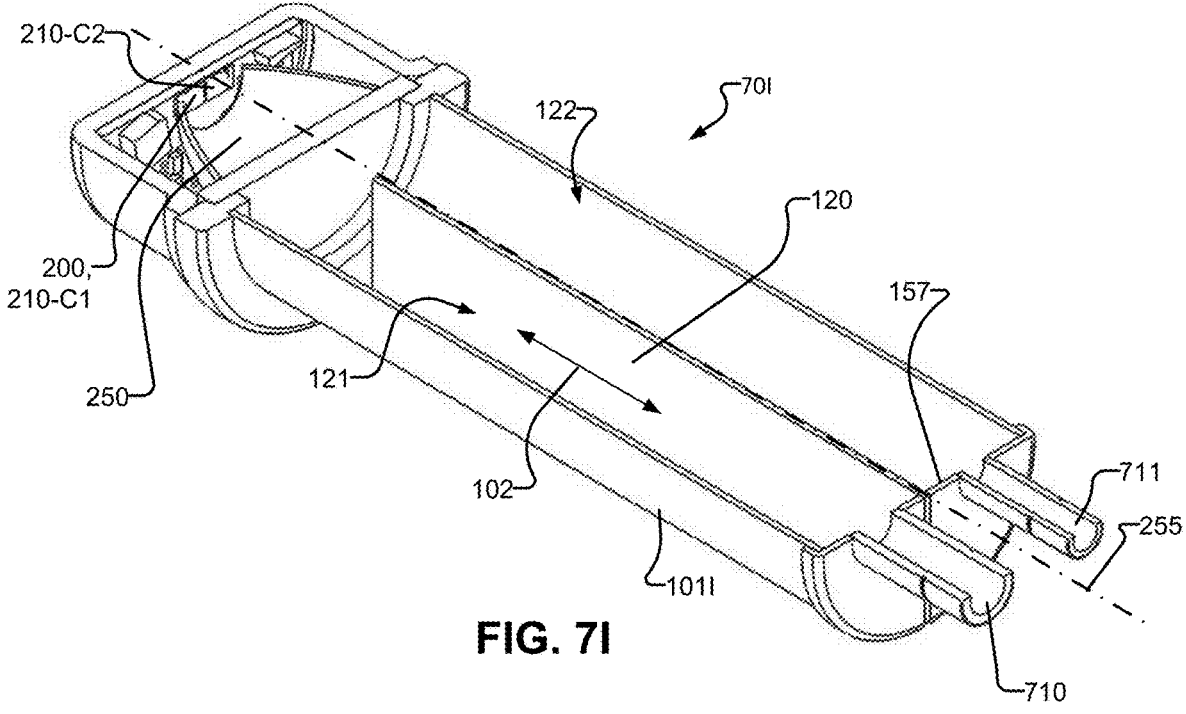
FIG. 7I is a cross-sectional perspective view of a UV reactor according to a particular embodiment, which provides implementational detail of an embodiment similar to the FIG. 7H schematic illustration.

Reactor 70H of the FIG. 7H example embodiment comprises features that are similar to those of reactor 70F in that reactor 70H comprises a divider 120 that splits channel 700H into inlet and outlet channels 121, 122 and further reactor 70H comprises a non-reflective wall 157, Reactor 70H (of the FIG. 7H embodiment) differs from reactor 70F (of the FIG. 7F embodiment) in that emitter 200 of reactor 70H comprises a plurality of UV radiation sources (e.g. UV-LEDs) 210C1, 210C2, . . . (collectively, radiation sources 210C) which share a reflector cone 250 in a manner similar to radiation sources 210A of reactor 70B (FIG. 7B). Reactor 70H further differs from reactor 70F in that reactor 101H of reactor 70H is generally cylindrically shaped, which in turn provides the reactor 70H inlet and outlet channels 121, 122 with shapes that are different than the shapes of the reactor 70F inlet and outlet channels 121, 122. Reactor 70H is also shown with a static mixer 259 which may help to mix fluid 11 in reactor 70H. In the illustrated embodiment, reactor 70H comprises a single static mixer 259 in inlet channel 121 relatively close to inlet 710, but, in some embodiments, reactor 70H could comprise multiple static mixers 259 and such mixers could be located in inlet channel 121 and/or outlet channel 120. It will be appreciated that static mixers 259 could be provided in any of the other reactor embodiments described herein. FIG. 7I is a cross-sectional perspective view of a UV reactor 70I according to a particular embodiment, which provides implementational detail of an embodiment similar to the FIG. 7H schematic illustration. For clarity, reactor 70I shown in FIG. 7I omits static mixer 259. Otherwise reactor 70I of FIG. 7I incorporates similar features to those of the FIG. 7H reactor 70H and should be understood to include the features of reactor 70H described herein.

In the FIGS. 7E-7H example embodiments, divider 120 has a generally transversely oriented longitudinal end 123 that is most proximate to emitter 200. End 123 may comprise a number of possible shapes comprising longitudinal and transversely extending protrusions and/or recesses, as illustrated by patterned surfaces 123A-F in FIG. 11, which promote static mixing between inlet and outlet channels 121, 122.

Patterned surfaces 123B-F each comprise protrusions and/or recesses oriented at a number of different angles with respect to the general transverse orientation of longitudinal end 123. The protrusions and/or recesses on patterned surfaces 123B-F may promote static mixing between inlet and outlet channels 121, 122.

FIGS. 8A-D are schematic longitudinally oriented cross-section views of UV reactors 80A-80D (collectively reactors 80) comprising multiple UV emitters 200 according to a number of example embodiments. FIGS. 8A-D show reactors having a variety of different LED emitter locations and/or reflective wall locations. UV reactors 80 each comprise a plurality of emitters 200 oriented to direct radiation into their respective main chambers 800A, 800B, 800C, 800D (collectively, main chambers 800). For each reactor 80, fluid 11 flows into its main chamber 800 from a respective inlet 810A, 810B, 810C, 810D (collectively, inlets 810) and out of main chamber 800 from a respective outlet 811A, 811B, 811C, 811D (collectively, outlets 811). In some embodiments, some or all the surfaces that define main chamber 800 (other than in the regions of emitters 200) are coated with or otherwise comprise a material that is reflective to radiation 12 emitted by emitter 200. Having multiple emitters 200 can advantageously enhance the UV fluence rate inside main chamber 800.

Main chambers 800 are generally cuboid shaped in the example embodiments shown in FIGS. 8A-D, but this is not necessary. Main chambers 800 may be cylindrical, ellipsoidal, etc. to accommodate various velocity profiles for fluid 11.

Figure 8A:
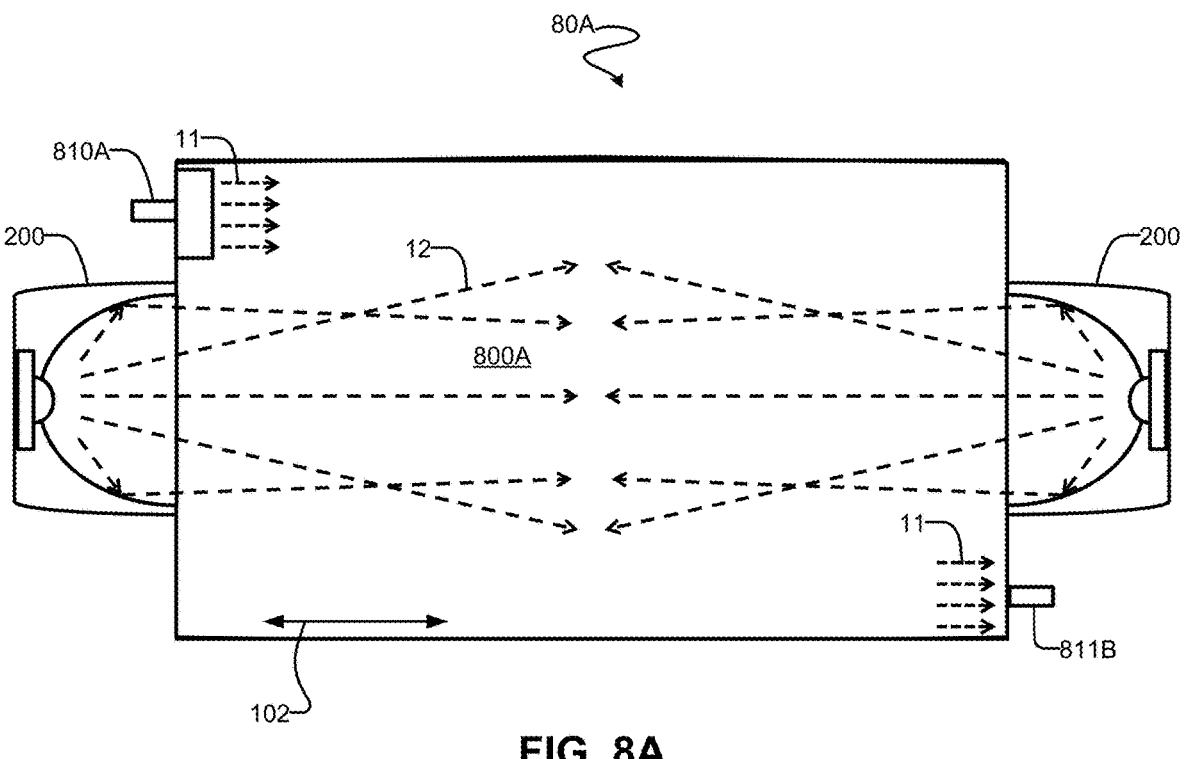
FIGS. 8A-D are schematic longitudinally oriented cross-section views of UV reactors comprising UV emitters generally oriented in multiple directions (e.g. multiple opposing directions) according to a number of example embodiments.

In reactor 80A of the FIG. 8A example embodiment, inlet 810A and outlet 811B are located at opposing longitudinal (direction 102) ends and on opposing transverse (orthogonal to direction 102) sides of main chamber 800A. Reactor 80A comprises two emitters 200 located at opposing faces of the main chamber 800A. Reactor 80A may advantageously provide more radiation fluence rate and/or more radiation coverage in main chamber 800A as compared to embodiments having a single emitter 200. Also, in reactor 80A of the FIG. 8A example embodiment the body of reactor 80A has a uniform (constant) transverse cross-section, which may make it easier to manufacture than some other embodiments having variable transverse cross-section.

Figure 8B:
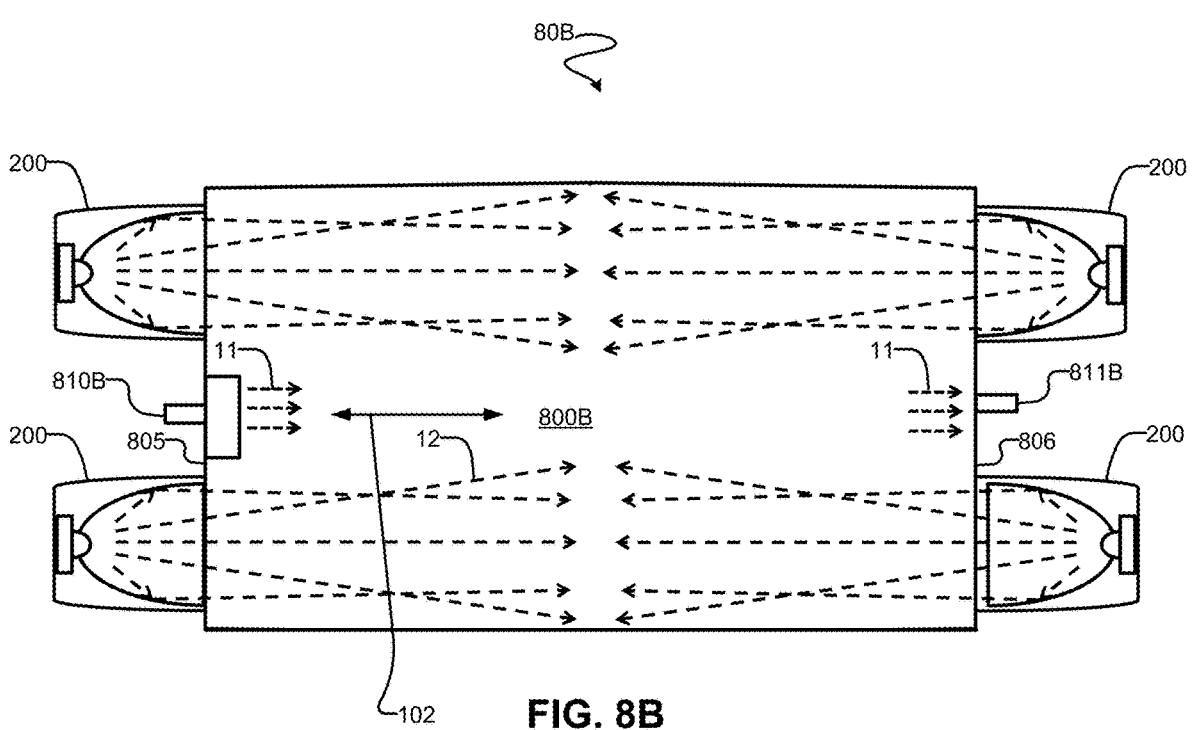

In reactor 80B of the FIG. 8B example embodiment, inlet 810B and outlet 811B are located at opposing longitudinal faces 805 and 806 of main chamber 800B, but are located at the same transverse locations (which happens to be at the transverse center of reactor 80B, although this is not necessary). Reactor 80B comprises two emitters 200 located at first longitudinal end face 805 and two emitters 200 located at second longitudinal end face 806. In some embodiments, the principal optical emission axes of a pair of emitters 200 located at opposing faces 805 and 806 are co-axial and are oriented in longitudinal direction 102. Reactor 80B of FIG. 8B may share some of the advantages of reactor 80A shown in FIG. 8A.

Figure 8C:
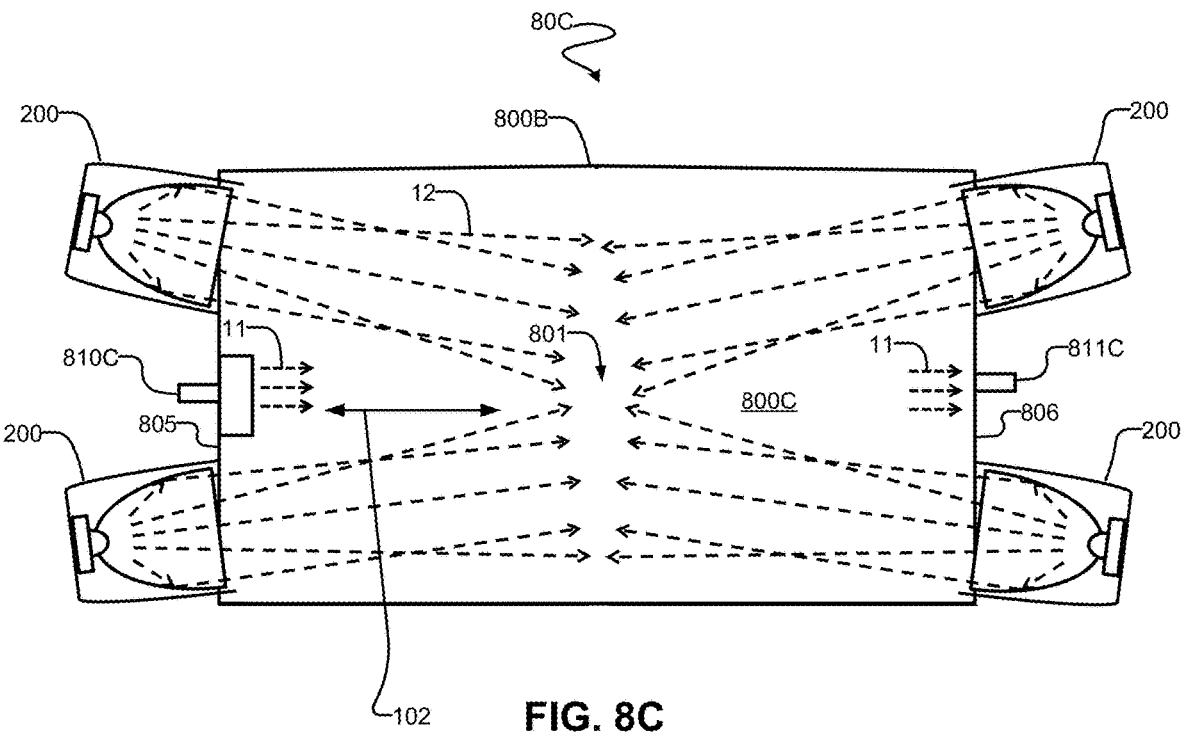

Reactor 80C of the FIG. 8C example embodiment comprises features that are similar to those of reactor 80B, except that emitters 200 are oriented with their principal optical emission axes to be oriented at various angles with respect to longitudinal direction 102. Such emitter orientations may focus UV radiation 12 at a volume 801 located at the center of main chamber 800C. This enhances UV fluence rate in volume 801, where the velocity of fluid 11 may be high. Providing higher UV fluence rate at locations with high fluid velocity and lower UV fluence rate at locations with low fluid velocity can advantageously enhance dose uniformity delivered to fluid 11 passing through reactor 80C. Reactor 80C of FIG. 8C may share some of the advantages of reactor 80A shown in FIG. 8A.

Figure 8D:
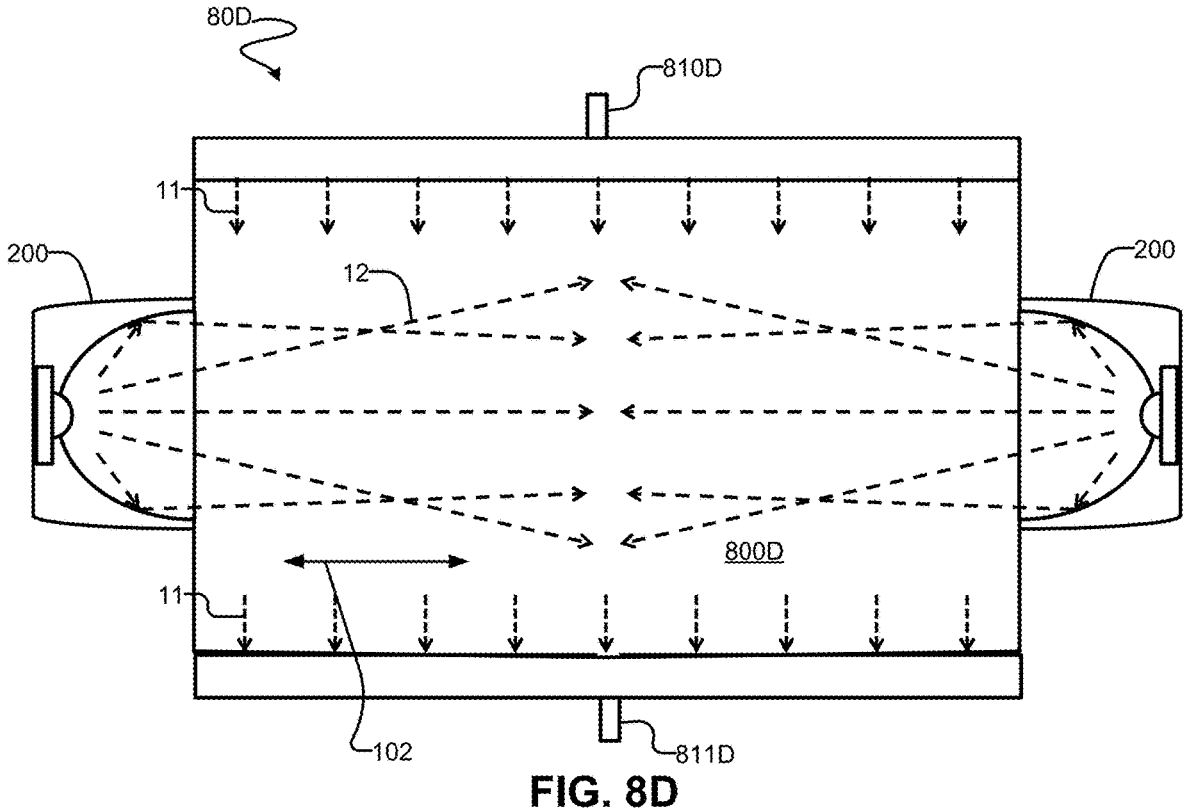

In reactor 80D of the FIG. 8D example embodiment, inlet 810C and outlet 811C are located at transversely opposing faces of main chamber 800D, while emitters 200 are located at longitudinally opposing faces of main chamber 800D. Emitters 200 emit radiation 12 in a direction that is generally orthogonal to the direction of flow of fluid 11 in reactor 80D, which may, in some embodiments, provide higher UV fluence rate relative to radiation that is aligned with the flow direction.

Figure 13A:
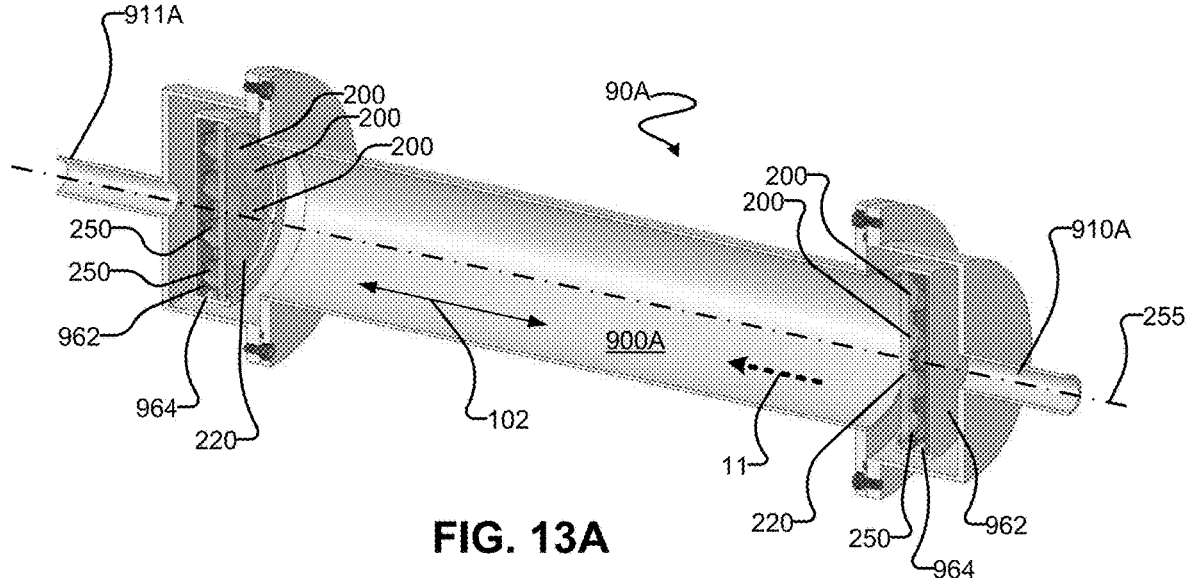
FIGS. 13A-13C schematic longitudinally oriented cross-section views of UV reactors comprising multiple UV emitters according to a number of example embodiments.
Figure 13B:
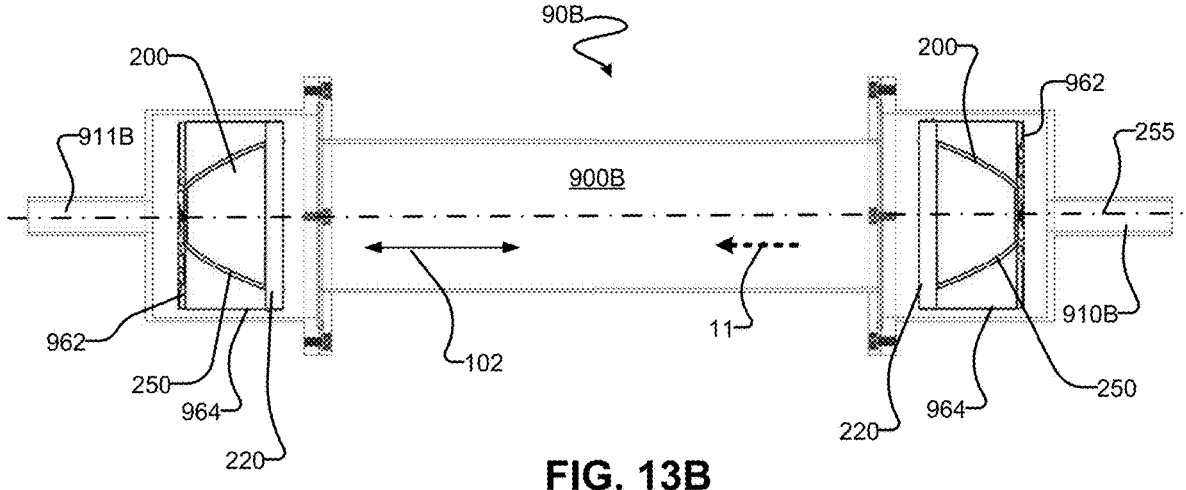
Figure 13C:
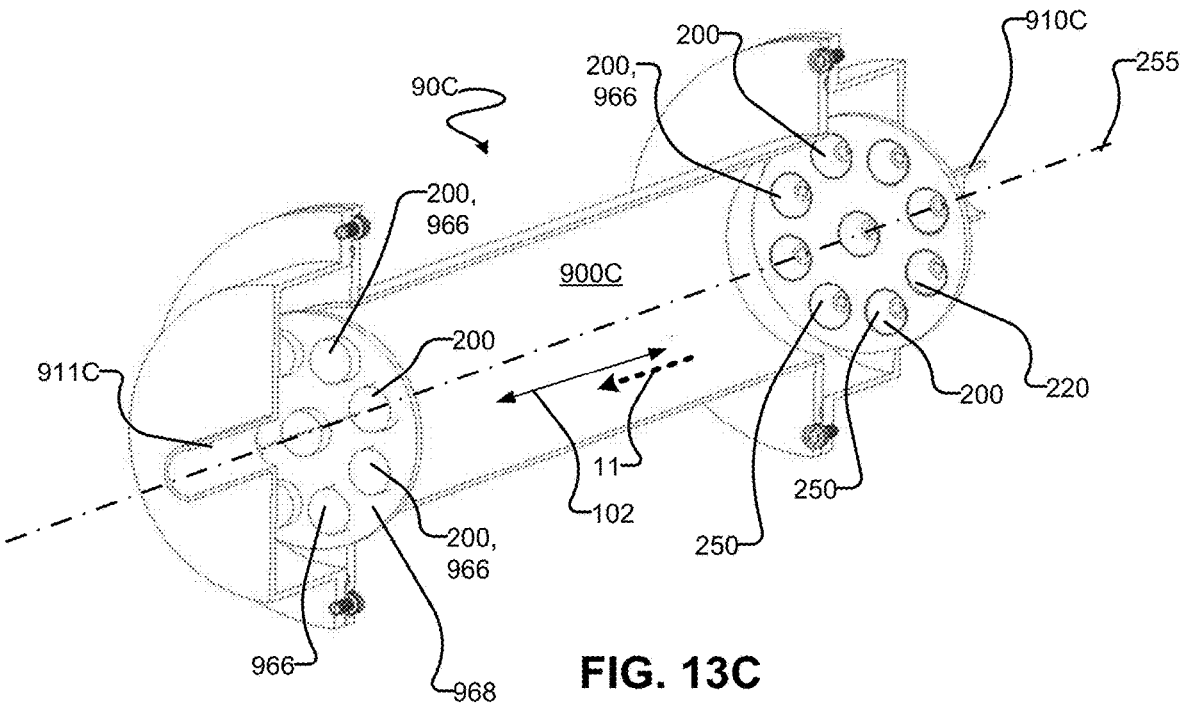

FIGS. 13A-13C schematic longitudinally oriented cross-section views of UV reactors 90A-90C (collectively reactors 90) comprising multiple UV emitters 200 according to a number of example embodiments. FIGS. 13A-13C show reactors having a variety of different LED emitter locations and configurations. UV reactors 90 each comprise a plurality of emitters 200 oriented to direct radiation into their respective main chambers 900A, 900B, 900C (collectively, main chambers 900). For each reactor 90, fluid 11 flows into its main chamber 900 from a respective inlet 910A, 910B, 910C (collectively, inlets 910) and out of main chamber 900 from a respective outlet 911A, 911B, 911C (collectively, outlets 911). In some embodiments, some or all the surfaces that define main chamber 800 (other than in the regions of emitters 200) are coated with or otherwise comprise a material that is reflective to radiation 12 emitted by emitter 200. Having multiple emitters 200 can advantageously enhance the UV fluence rate inside main chamber 900.

Main chambers 900 are generally cylindrical shaped with uniform transverse cross-section in the example embodiments shown in FIGS. 13A-C, but this is not necessary. Main chambers 900 may be cuboid, ellipsoidal, etc. to accommodate various velocity profiles for fluid 11. In each of the embodiments of FIGS. 13A-13C, inlets 910 and outlets 911 are located at opposing longitudinal (direction 102) ends and on opposing transverse (orthogonal to direction 102) sides of main chamber 900A. Also, in each of the embodiments of FIGS. 13A-13C, there are one or more emitters 200 located in corresponding cavities at opposing ends of the main chambers 900. Such opposing emitters 200 may advantageously provide more radiation fluence rate and/or more radiation coverage in main chambers 900 as compared to embodiments having a single-sided emitters 200. In each of the embodiments of FIGS. 13A-13C, one or more thermal conductors (not shown) may be thermally coupled to their respective solid-state radiation sources and in thermal contact with their respective emitter housing which in turn is contacted by the fluid when the fluid is flowing from the inlet to the outlet.

Reactors 900A, 900B and 900C differ in the configuration of their emitters 200.

In reactor 900A of FIG. 13A, each longitudinal end of reactor 900A comprises an emitter housing 964 comprising a single PCB which supports a plurality of spaced apart UV-LEDs (not expressly shown), with one or more LEDs corresponding to each emitter 200 located at the base of a corresponding reflector cone 250. Emitter housing 964 of the illustrated embodiment comprises a single UV-transparent (e.g. quartz) window 220 which forms part of the housing for UV-LEDs and reflector cones 250. Fluid 11 flows around a transverse perimeter of emitter housings 964 at the inlet end and outlet end of chamber 900A. The one or more thermal conductors (not shown) may be thermally coupled to their respective solid-state radiation sources and in thermal contact with the inlet and outlet emitter housings 964 such that fluid 11 flowing around a transverse perimeter of emitter housings 964 dissipates heat generated by UV-LEDs or otherwise. In some embodiments, the shape of reflector cones 250 for individual emitters 200 may vary depending on the location of the emitter 200 (e.g. on the location of the emitter relative to central axis 255). In some embodiments, it is not necessary that all of the UV-LEDs are located on a single PCB. In some embodiments, emitter housing 964 comprises a plurality of PCBs, each of which support one or more UV-LEDs corresponding to each emitter 200. In some embodiments, some or all of the reflector cones 250 housed in emitter housing 964 are supported by a single reflector support and one or more PCBs comprise a plurality of UV-LEDs located such that one or more UV-LEDs are positioned at the base of each reflector cone 250.

Reactor 900B of FIG. 13B is similar to reactor 900A of FIG. 13A, except that reactor 900B comprises a single emitter 200 at each of its longitudinal ends.

Reactor 900C of FIG. 13C is also similar to reactor 900A of FIG. 13A, except that rather than having a reactor housing that houses a number of emitters, reactor 900C comprises a plurality of modular emitter housings 966, each of which houses its own UV-LEDs (not expressly shown) and reflector cone 250 and each of which comprises its own UV-transparent window 220. Advantageously, the modularity of emitters 200 and emitter housings 966 of the FIG. 13C embodiment permits them to be interchanged in the event that one of emitters 200 is performing in a substandard manner. In the illustrated embodiment, emitter housings 966 are supported in their respective locations by holder plate 968. Holder plate 968 is not necessary, however, and in some embodiments emitter housings 966 could be supported in suitable locations by other support mechanisms. In the illustrated embodiment, fluid 11 flows around a transverse perimeter of holder plate 968 at the inlet end and outlet end of chamber 900C. One or more thermal conductors (not shown) may be thermally coupled to their respective solid-state radiation sources and in thermal contact with their corresponding inlet and outlet emitter housings 966 such that fluid 11 flowing around emitter housings 966 dissipates heat generated by UV-LEDs or otherwise. The flow of fluid 11 around the transverse perimeter of holder plate 968 is not necessary. In some embodiments, fluid 11 flows between the individual modular emitter housings 966 through suitably shaped apertures or conduits in the support mechanism. Advantageously, this flow of fluid 11 between the individual modular emitter housings 966 may improve heat dissipation by the fluid 11 because of the relatively large surface area associated with a plurality of smaller emitter housings 966 and the proximity of the flow to the individual emitter housings 966. As discussed above, one or more thermal conductors (not shown) may be thermally coupled to their respective solid-state radiation source(s) and in thermal contact with their respective emitter housing, which in turn is contacted by the fluid when the fluid is flowing from the inlet to the outlet. In some embodiments, the shape of reflector cones 250 for individual emitters 200 may vary depending on the location of the emitter 200 (e.g. on the location of the emitter relative to central axis 255).

Simulation Study

In some embodiments, it is desirable to control the radiation and fluid velocity profiles in UV reactors, so that there is higher radiation fluence rate in regions of the reactor where fluid velocity is higher. The inventors considered several simulated case studies, where the radiation was UV radiation, the fluid was water, and a number of virtual prototype photoreactors were used for UV inactivation of microorganisms. FIGS. 10A-I depict simulation results observed by the inventors. The simulations simulate the radiation, hydrodynamics and disinfection kinetics inside the photoreactor using virtual prototyping software and observed that the performance of a photoreactor having features of reactor 10 (FIG. 1) is a strong function of radiation and velocity distributions. The simulated photoreactor 10 addresses both factors by using a UV-C reflector (i.e. reflector cone 250) for controlling the radiation pattern and UV-C reflective back plate (i.e. for controlling the velocity profile via optimized openings for fluid inlets as well as contribution to radiation pattern control). Using these components, a wide range of velocity and radiation patterns can be maintained.

Velocity profile (reactor's hydrodynamics) can be controlled by designing reflective wall 150 to be a suitable flow distributor, through optimizing the layout and dimensions of openings 151. The radiation profile (reactor's optics) can be controlled by designing the reflector cone 250, through optimizing the shape and dimension of reflector cone, as well as, the UV reflective characteristics of reflective wall 150. FIG. 10A-C show the effectiveness of the design of reflective wall 150 on controlling the velocity profile (reactor's hydrodynamics), where various opening 151 configurations of reflective wall 150 result in targeted/desired velocity profiles, including but not limited to, a relatively uniform velocity profile (FIG. 10A), a relatively linear velocity profile (FIG. 10B), and a relatively desired/optimized velocity profile (FIG. 10C). The resultant fluid velocity profile of a fluid passing through a surface with openings is known to be a function of the shapes (including size) and positions of the surface's openings. As a general rule of fluid dynamics, more flow passes through openings with less pressure drop (restriction), therefore, a desired velocity profile (e.g. uniform, linear. or optimized) can be maintained through optimized designing of openings 151. Specifically, a desired velocity profile in chamber 101 may be constructed as an objective function of an optimization problem, for which the variables to optimize may comprise the parameters (e.g. presence, shapes, and/or locations) of openings 151 in reflective wall 150. FIG. 10A shows a simulation where uniform velocity is used to construct an objective function, FIG. 10B shows a simulation where a linear velocity profile is used to construct an objective function and FIG. 10C shows a simulation where an optimal velocity profile is used to construct an objective function. FIGS. 10A-C show how the velocity and residence time distribution can be controlled by suitable shaping and positioning of openings 151.

With an identical radiation pattern inside the reactor (combined elliptical/parabolic reflector 250H (FIG. 5D) was used for further simulation study), the efficiency of a reactor changes from 51% for the reactor with uniform velocity profile (FIG. 10D), to 59% for the reactor with linear velocity profile (FIG. 10E), and eventually to 63% for the reactor with desired/optimized velocity profile (FIG. 10F). Similarly, the reflector 250 can be designed as such to control the fluence rate inside the reactor. Using an identical reflective wall 150 having identical openings 151, resulting in an identical velocity profile inside the reactor, the efficiency of the reactor changes from 53%, as shown in FIG. 10G, for the reactor with elliptical reflector 250D (FIG. 5A), to 51%, as shown in FIG. 10H, for the reactor with parabolic reflector 250G (FIG. 5B), and eventually to 63%, as shown in FIG. 10I, for the reactor with desired/optimized reflector 250H (FIG. 5D).

The scope of the present invention includes a variety of possible supplementary designs to reactor 10 and/or other aspects of reactor 10. Where suitable, these variations may be applied to any of the reactor embodiments described herein and include, without limitation the following:

the surfaces of the walls that define main chambers 100, 700, 800, 900 may be coated with or otherwise comprise suitable reflective material that is reflective to the radiation emitter by their corresponding emitters;

source 210 may emit radiation of any suitable wavelengths along the electromagnetic spectrum (e.g. infrared radiation, visible light, ultraviolet radiation, etc.);

fluid 11 may include any suitable liquid and/or gas;

any suitable radiation source 210 (e.g. UV lamps) can be located relative to any reflector cone 250 to provide suitable radiation fluence rate distributions;

one or more flow restrainer or flow modifiers (e.g. static mixers, baffle, vortex generators, or other types of flow mixers) that are at least partially made of UV reflective materials may be located within main chambers 100, 700, 800, 900. Such baffles may help to shape the fluid flow within the main chamber;

photocatalyst materials may be located within main chambers 100, 700, 800, 900 a chemical reagent may be located within main chambers 100, 700, 800, 900;

radiation source 210 may be turned on and off by an external signal;

emitter 200 may comprise one or more lenses (e.g. collimating lenses) located in front of radiation source 210 to refract (e.g. collimate) radiation 12 emitted by radiation source 210; and emitter 200 may comprise a UV sensor (e.g. photodiode) located adjacent to radiation source 210 for detecting radiation 12 and suitable electronics for transmitting and receiving data to and from the UV sensor.

In some embodiments, a dynamic mixer may be provided within main chambers 100, 700, 800, 900. The dynamic mixer may move with the momentum from the fluid flow to further mix the flow of fluid 11. One or more static mixers (which may in turn comprise one or a combination of delta wing shaped mixers and/or twisted tape shaped mixers) may be provided within reaction chambers 100, 700, 800, 900. The delta wing shaped mixers and/or twisted tap shaped mixers may be connected to each other at some parts (e.g. at the base or vertex). The delta wing shaped mixers and/or twisted tap shaped mixers may be located adjacent to each other. In some embodiments, one or more dynamic mixers and/or one or more static mixers are positioned proximate to fluid inlets 110, 710, 810, 910.

Some embodiments provide mechanisms for generating a vortex or vortices (i.e. using static or dynamic mixers) over a portion of the fluid flow channel in main chambers 100, 700, 800, 900. Such mechanisms may cause the fluid 11 to travel in regions of both higher and lower radiation fluence rates. In some embodiments, one or more flow modifiers may be applied to prevent the fluid from flowing at high velocities in the regions of main chambers 100, 700, 800, 900 having low fluence rates. In some embodiments, one or more flow modifiers may redirect the flow from regions of main chambers 100, 700, 800, 900 having low fluence rates to the regions of main chambers 100, 700, 800, 900 having higher fluence rates.

In some embodiments, reaction chambers 100, 700, 800, 900 are made of polymer manufacturing processes. Suitable polymer manufacturing processes include injection moulding or the like. In some such embodiments, the body and the housing for the reflective wall may be provided as a single unit.

In some embodiments, reaction chambers 100, 700, 800, 900 are made of steel manufacturing processes. Suitable steel manufacturing processes include deep drawing or the like. In some such embodiments, the body and the housing for the reflective wall may be provided as a single unit.

Some embodiments provide various thermal management strategies adopted for cooling source 210. Examples of thermal management strategies include direct water cooling, use of an electric fan, use of a thermoelectric cooler, and use of a heat sink.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

While a number of exemplary aspects and embodiments have been discussed above, those of skill in the art will recognize certain modifications, permutations, additions and sub-combinations thereof. By way of non-limiting example:

In most of the embodiments described above, the principal optical axis 211 of the radiation source 210 is aligned with a central axis (e.g. an axis of symmetry) 255 of the reflector cone 250. This is not necessary. In some embodiments, the principal optical axis 211 of the radiation source 210 may be skewed with respect to the central axis 255 of the reflector cone 250. In general, the principal optical axis 211 of the radiation source 210 may have any suitable orientation which is beneficial for achieving any suitable radiation distribution objective. In some embodiments, radiation source may comprise several LEDs or other radiation sources which may each have different principal optical axes. These different principal optical axes may be oriented in the same direction or different directions. In some such embodiments, radiation source 210 may be considered to have multiple principal optical axes and these axes may have different orientations. In some embodiments, these different orientations may be symmetric about a central axis 255 of reflector cone 250, although this is not necessary.

Any of the emitters described herein may be modified to comprise (or may otherwise comprise) a plurality of radiation sources (e.g. UV-LEDS), with each radiation source having its own reflective cone. FIGS. 12A-12D show non-limiting examples of different numbers and arrangements of radiation sources and their corresponding reflector cones.

It is therefore intended that the following appended claims and claims hereafter introduced are interpreted to include all such modifications, permutations, additions and sub-combinations as are consistent with the broadest interpretation of the specification as a whole.

The invention claimed is:

1. A fluid treatment apparatus comprising:
   a main chamber defined by a body, the main chamber extending in a longitudinal direction;
   a radiation emitter located at a first longitudinal end of the main chamber, the radiation emitter further comprising:
      a reflector cone comprising a reflective surface that defines a reflector cone concavity; and
      a radiation source located in the reflector cone concavity;
      the reflective surface of the reflector cone shaped to direct radiation from the radiation source into the main chamber in a direction having at least a component oriented in the longitudinal direction; and
   a wall shaped to define a plurality of openings in fluid communication with the main chamber, the plurality of openings providing an inlet for conducting fluid into the main chamber; and
   an outlet for conducting fluid out of the main chamber;
   wherein the plurality of openings are at least one of shaped and located to provide non-uniform flow of fluid into the main chamber; and
   wherein the plurality of openings in the wall have a cross-section per unit area that increases with distance from the outlet over the entire wall as the wall extends across a cross-section of the body.

2. A fluid treatment apparatus according to claim 1 wherein the wall is located at a second longitudinal end of the main chamber, the second longitudinal end opposed to the first longitudinal end.

3. A fluid treatment apparatus according to claim 1 wherein the wall comprises a reflective surface facing the main chamber.

4. A fluid treatment apparatus according claim 3 wherein the reflective surface of the wall has a transverse surface area that is greater than a transverse cross-section of the main chamber at the first longitudinal end of the main chamber.

5. A fluid treatment apparatus according to claim 1 wherein at least a longitudinally central region of the main chamber is symmetric about a longitudinally oriented axis of symmetry and wherein the reflective surface of the reflector cone is shaped so that radiation emitted into the main chamber has a longitudinally oriented principal optical axis.

6. A fluid treatment apparatus according to claim 5 wherein the axis of symmetry of the main chamber and the longitudinally oriented principal optical axis are co-axial.

7. A fluid treatment apparatus comprising:
   a main chamber defined by a body, the main chamber extending in a longitudinal direction;
   a radiation emitter located at a first longitudinal end of the main chamber, the radiation emitter further comprising:
      a reflector cone comprising a reflective surface that defines a reflector cone concavity; and
      a radiation source located in the reflector cone concavity;
      the reflective surface of the reflector cone shaped to direct radiation from the radiation source into the main chamber in a direction having at least a component oriented in the longitudinal direction; and
   a wall shaped to define a plurality of openings in fluid communication with the main chamber, the plurality of openings providing an inlet for conducting fluid into the main chamber; and
   an outlet for conducting fluid out of the main chamber;
   wherein the plurality of openings are at least one of shaped and located to provide non-uniform flow of fluid into the main chamber; and
   wherein the apparatus comprises a plurality of auxiliary reflectors, each of the auxiliary reflectors disposed, relative to the wall, to partially cover at least one of the plurality of openings, the auxiliary reflectors positioned to provide additional reflection of at least some of the radiation emitted by the radiation emitter which would otherwise pass through the one or more openings, while still permitting fluid communication between the main chamber and the one or more openings.

8. A fluid treatment apparatus according to claim 1 comprising a plurality of auxiliary reflectors, each of the auxiliary reflectors extending from the wall in a non-orthogonal direction and each of the auxiliary reflectors comprising a reflective surface to provide additional reflection of at least some of the radiation emitted by the radiation emitter which would otherwise pass through the plurality of openings, while still permitting fluid communication between the main chamber and the plurality of openings.

9. A fluid treatment apparatus according to claim 1 comprising one or more lenses positioned to refract radiation from the radiation source.

10. A fluid treatment apparatus according to claim 1 wherein the radiation source comprises a plurality of solid state emitters.

11. A fluid treatment apparatus according to claim 1 further comprising a longitudinally extending wall located in the main chamber.

12. A fluid treatment apparatus according to claim 11 wherein at least a portion of the longitudinally extending wall comprises a photocatalyst material.

13. A fluid treatment apparatus according to claim 1 wherein the radiation emitter comprises a plurality of solid state emitters.

14. A fluid treatment apparatus according to claim 1 wherein a surface of the wall is coated with a UV-transparent material, wherein the surface coated with the UV-transparent material faces the main chamber.

15. A fluid treatment apparatus according to claim 1 comprising a photocatalyst supported on a structure in the main chamber.

16. A fluid treatment apparatus according to claim 1 comprising a flow restraining element for restraining the fluid flow in the main chamber, the flow restraining element comprising at least one of a static mixer, a baffle, and a vortex generator.

17. A fluid treatment apparatus according to claim 1 wherein the one or more main chamber defining surfaces of the body comprise a reflective surface.

18. A method for fluid treatment, the method comprising:

providing a fluid treatment apparatus according to claim 1;

causing a fluid to flow through the inlet into the main chamber and out of the outlet;

irradiating the fluid as it flows through the main chamber with radiation from the radiation emitter.

19. A fluid treatment apparatus comprising:

a main chamber defined by a body, the main chamber extending in a longitudinal direction;

a radiation emitter located at a first longitudinal end of the main chamber, the radiation emitter further comprising:

a reflector cone comprising a reflective surface that defines a reflector cone concavity, the reflective surface shaped to be paraboloidic over a first portion of the reflective surface and ellipsoidal over a second portion of the reflective surface; and a radiation source located in the reflector cone concavity;

the reflective surface of the reflector cone shaped to direct radiation from the radiation source into the main chamber in a direction having at least a component oriented in the longitudinal direction.

* * * * *